United States Patent
Murakami et al.

(10) Patent No.: US 10,412,069 B2
(45) Date of Patent: Sep. 10, 2019

(54) PACKET TRANSMITTING APPARATUS, PACKET RECEIVING APPARATUS, AND COMPUTER READABLE MEDIUM

(71) Applicant: Mitsubishi Electric Corporation, Tokyo (JP)

(72) Inventors: Yumiko Murakami, Tokyo (JP); Nobuhiro Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 161 days.

(21) Appl. No.: 15/544,469

(22) PCT Filed: Jan. 19, 2015

(86) PCT No.: PCT/JP2015/051192
§ 371 (c)(1),
(2) Date: Jul. 18, 2017

(87) PCT Pub. No.: WO2016/116999
PCT Pub. Date: Jul. 28, 2016

(65) Prior Publication Data
US 2017/0353440 A1    Dec. 7, 2017

(51) Int. Cl.
*H04L 9/00* (2006.01)
*H04L 29/06* (2006.01)
(Continued)

(52) U.S. Cl.
CPC ............ *H04L 63/08* (2013.01); *H04L 9/0643* (2013.01); *H04L 9/3242* (2013.01);
(Continued)

(58) Field of Classification Search
CPC ...................................................... H04L 63/08
See application file for complete search history.

(56) References Cited

U.S. PATENT DOCUMENTS

| | | | |
|---|---|---|---|
| 5,673,318 A | 9/1997 | Bellare et al. | |
| 5,757,913 A | 5/1998 | Bellare et al. | |

(Continued)

FOREIGN PATENT DOCUMENTS

| | | |
|---|---|---|
| EP | 2 087 766 B1 | 4/2011 |
| JP | 6-315027 A | 11/1994 |

(Continued)

OTHER PUBLICATIONS

"The Keyed-Hash Message Authentication Code (HMAC)", FIPS PUB 198-1: Federal information Processing Standards Publication, Jul. 2008, pp. 1-7 (Total No. pp. 13).

(Continued)

*Primary Examiner* — Josnel Jeudy
(74) *Attorney, Agent, or Firm* — Birch, Steewart, Kolasch & Birch, LLP

(57) ABSTRACT

An edit data generation unit concatenates the message authentication code of an X−1th data block with the message authentication code of an Xth data block, thereby generating Xth edit data. An additional data generation unit generates the message authentication code of the Xth edit data, and extracts a portion of the message authentication code of the Xth edit data as Xth additional data. A packet generation unit generates an Xth packet including the Xth data block and the Xth additional data. A packet transmitting unit transmits the Xth packet.

8 Claims, 34 Drawing Sheets

(51) Int. Cl.
  *H04L 29/12* (2006.01)
  *H04L 9/06* (2006.01)
  *H04L 9/32* (2006.01)

(52) U.S. Cl.
  CPC .... *H04L 29/12839* (2013.01); *H04L 63/0876* (2013.01); *H04L 63/123* (2013.01)

(56) References Cited

U.S. PATENT DOCUMENTS

| | | |
|---|---|---|
| 6,754,824 B1 | 6/2004 | Persson et al. |
| 8,122,247 B2 | 2/2012 | Patel |
| 8,204,216 B2 | 6/2012 | Patel |
| 8,256,015 B2 | 8/2012 | Gentry et al. |
| 9,331,854 B2 | 5/2016 | Oguma et al. |
| 2002/0169971 A1* | 11/2002 | Asano ................ G06F 21/10 713/193 |
| 2005/0010759 A1 | 1/2005 | Wakiyama |
| 2006/0136728 A1 | 6/2006 | Gentry et al. |
| 2010/0005310 A1 | 1/2010 | Gentry et al. |
| 2012/0093312 A1 | 4/2012 | Gammel et al. |
| 2012/0331308 A1* | 12/2012 | Fernandez Gutierrez ............ G06F 21/71 713/190 |
| 2014/0304511 A1* | 10/2014 | Lewis ................ G09C 1/00 713/170 |
| 2014/0310530 A1 | 10/2014 | Oguma et al. |
| 2014/0351598 A1* | 11/2014 | Abraham ............ H04L 9/0825 713/176 |
| 2016/0134628 A1* | 5/2016 | Bowler ............... H04L 63/0876 713/170 |
| 2016/0267024 A1* | 9/2016 | Bowler ................. G06F 21/78 |
| 2017/0237732 A1* | 8/2017 | Bando ................ H04L 63/0876 726/6 |

FOREIGN PATENT DOCUMENTS

| | | |
|---|---|---|
| JP | 2001-251296 A | 9/2001 |
| JP | 2001-519930 A | 10/2001 |
| JP | 2003-503743 A | 1/2003 |
| JP | 2005-12466 A | 1/2005 |
| JP | 2005-72650 A | 3/2005 |
| JP | 2005-167942 A | 6/2005 |
| JP | 2007-503134 A | 2/2007 |
| JP | 2008-99068 A | 4/2008 |
| JP | 2009-25657 A | 2/2009 |
| JP | 2010-207982 A | 3/2010 |
| JP | 2010-508719 A | 3/2010 |
| JP | 2010-510756 A | 4/2010 |
| WO | WO 99/40702 A1 | 8/1999 |
| WO | WO 2010/024379 A1 | 3/2010 |
| WO | WO 2013/065689 A1 | 5/2013 |

OTHER PUBLICATIONS

Harada et al. "Notes on message authentication", IEICE Technical Report, Jan. 26, 1988, vol. 87, No. 345, pp. 25-30 (Total No. pp. 8).

* cited by examiner

PACKET TRANSMITTING APPARATUS, PACKET RECEIVING APPARATUS, AND COMPUTER READABLE MEDIUM

TECHNICAL FIELD

The present invention relates to communication of a packet including a message authentication code.

BACKGROUND ART

The spread of the Internet has increased an opportunity for performing communication that needs reliability and confidentiality. The reliability means integrity of data, and the integrity of the data means that the data is not falsified during transmission. The falsification includes a data error caused by noise. The integrity is secured by using an encryption technique.

The data error may be detected by a technique using an error detection code such as a check sum. This technique is the one whereby message data is encoded into longer data to detect a data error using redundancy of the longer data. This technique has, however, a weak resistance to intentional and sophisticated falsification by a third party.

A message authentication technique is employed against intentional falsification by a third party. The message authentication technique is a generic name for techniques for detecting falsification by adding a message authentication code (MAC) to message data.

In order not to falsify data being transmitted, a situation is necessary where only a limited person can generate a valid MAC. In order to achieve that purpose, it is necessary for a transmitter and a receiver to share a common key and a MAC generating function in secret.

The transmitter inputs message data and the common key into the MAC generating function, and transmits a packet including the message data and a MAC. The receiver similarly generates a MAC using the message data and the common key and verifies whether the MAC generated is the same as the MAC received. If there is no falsification, both of the MACs are the same. If the both of the MACs are not the same, it is determined that the message data has been falsified, the MAC has been falsified, or both of the message data and the MAC have been falsified, so that the packet is discarded.

The message authentication technique is a technique different from a technique for data concealment, and cannot be used for privacy protection. When message data is desired to be concealed, the message data is encrypted, and the message authentication technique is applied to the message data encrypted. This may achieve both of detection of falsification and the data concealment.

Non-patent Literature 1 discloses an HMAC that is one of typical message authentication technologies. The HMAC is an abbreviated name for a Hash-based Message Authentication Code.

In the HMAC, hash algorithms such as SHA-1 and MD5 are used for a core portion of an operation of generating a MAC, and the hash algorithms are respectively referred to as HMAC-SHA1 and HMAC-MD5.

In the HMAC, the hash algorithm may be treated as a black box. Thus, the hash algorithm satisfying a specific condition may be used. Security of the HMAC depends on security of the hash algorithm to be used.

The security of the HMAC is resistance to spoofing. The spoofing is to counterfeit a set of a message and a MAC by a third party not having a common key. Specifically, the spoofing is an action of counterfeiting the set of the message and the MAC being different from a valid set of a message and a MAC, based on the valid set of the message and the MAC, thereby passing MAC verification by a receiver.

In the HMAC, by reducing the size of a MAC generated, it is possible to shorten the MAC to be added.

To take an example, it is possible to use, as the MAC to be added, high-order 128 bits of a 256-bit MAC to be generated when HMAC-SHA256 is used.

However, when the MAC to be added is shortened, the security of the HMAC is reduced.

Recently, a system and a service referred to as M2M are spreading. The M2M is an abbreviated name for Machine to Machine.

This system and service is provided by a network configured by using a lot of devices with limited computational resources. Then, each of the devices autonomously operates without intervention of human control. The device with the limited computational resources is a sensor node, an RFID tag, or the like. RFID is an abbreviated name for a Radio Frequency IDentifier.

When the message data has a large size, the message data is divided into a plurality of data blocks and the data blocks are communicated using a plurality of packets in order to inhibit occupancy of a network band and reduce retransmission cost for partial damage of the message data.

In this case, the MAC generated by the message data as a whole can be given to a final one of the packets, for transmission. The receiver, however, cannot verify reliability of each packet until he receives the final packet.

On contrast therewith, Patent Literature 1 discloses a technique of generating a MAC for each divided data and transmitting a packet including the divided data and the MAC.

However, when the MAC is added to each divided data in narrow-band communication, the size of the divided data may exceed an upper band limit. Thus, when the MAC has a fixed length, the size of the divided data needs to be reduced. As a result, the number of packets increases, and it therefore takes time to transmit all the packets. Then, a large load is imposed on a path for the communication.

Patent Literature 2 discloses a technique of reducing a payload by providing a MAC function to an error detection code included in a digital information signal.

CITATION LIST

Patent Literature

Patent Literature 1: JP 2005-167942A
Patent Literature 2: JP 2003-503743A

Non-Patent Literature

Non-patent Literature: FEDERAL INFORMATION PROCESSING STANDARDS PUBLICATION 198 (FIPS PUB 198), The Keyed-Hash Message Authentication Code

SUMMARY OF INVENTION

Technical Problem

An object of the present invention is to add additional data to an Xth data block based on the Xth data block and an X−1th data block, thereby allowing verification of the Xth data block.

Solution to Problem

A packet transmitting apparatus of the present invention may include:
a message authentication code generation unit to generate, for each data block included in N data blocks, a message authentication code of the data block;
an edit data generation unit to generate Xth edit data being data to be generated using the message authentication code of an Xth data block and the message authentication code of an X–1th data block of the N data blocks, the Xth data block being one data block out of a second data block to an Nth data block in the N data blocks;
an additional data generation unit to generate Xth additional data using the Xth edit data, the Xth additional data being data to be added to the Xth data block;
a packet generation unit to generate an Xth packet including the Xth data block and the Xth additional data; and
a packet transmitting unit to transmit the Xth packet.

Advantageous Effects of Invention

According to the present invention, the additional data based on the Xth data block and the X–1th data block may be added. This allows the Xth data block to be verified, using the additional data.

DESCRIPTION OF EMBODIMENTS

First Embodiment

Figure 1:
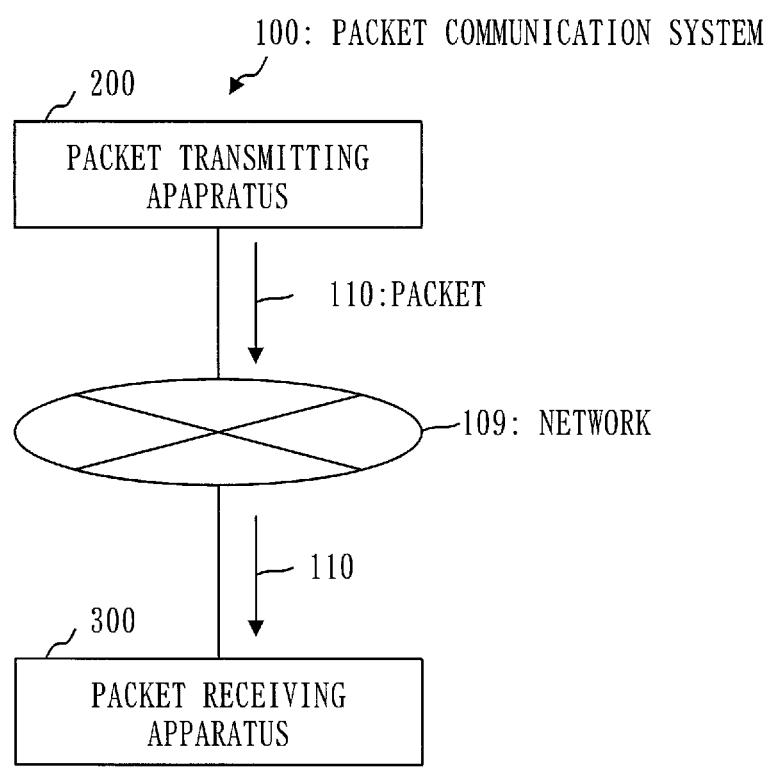
FIG. 1 is a configuration diagram of a packet communication system 100 in a first embodiment.
Figure 2:
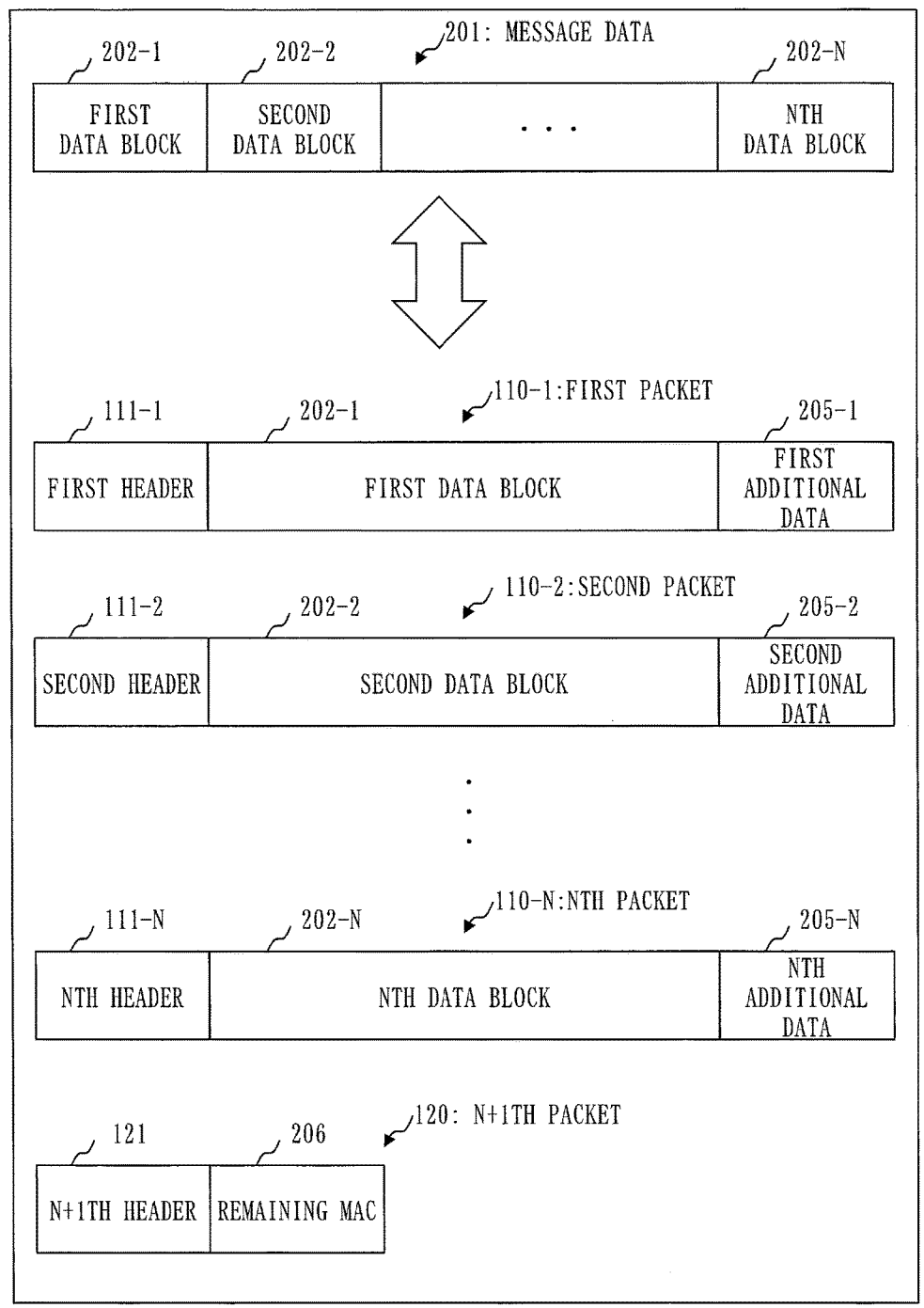
FIG. 2 is a diagram illustrating message data 201 and packets 110 in the first embodiment.

An embodiment of adding, to a data block, additional data for verifying the data block will be described, based on FIGS. 1 to 14.
Description of Configuration
A packet communication system 100 will be described, based on FIG. 1.
The packet communication system 100 is a system to communicate a packet 110.
The packet communication system 100 includes a packet transmitting apparatus 200 to transmit the packet 110 and a packet receiving apparatus 300 to receive the packet 110.
Each of the packet transmitting apparatus 200 and the packet receiving apparatus 300 transmits or receives the packet 110 through a network 109.
Message data 201 and the packet 110 will be described, based on FIG. 2.
The message data 201 is data to be transmitted.
The message data 201 is divided into a plurality of data blocks 202, according to the size of the packet 110. The number of division of the message data 201 is N. N is an integer of two or more.
The packet 110 is generated for each data block 202.
The packet 110 includes a header 111, the data block 202, and additional data 205.
The header 111 includes a packet number for identifying the packet 110. The packet number included in a first header 111-1 is 1, and the packet number included in an Nth header 111-N is N. The packet number also functions as a data block number for identifying the data block 202.

The additional data 205 is information for determining whether the data block 202 is a valid data block.

Further, an N+1th packet 120 is generated.

The N+1th packet 120 includes an N+1th header 121 and a remaining message authentication code 206. A MAC in the drawing is an abbreviated name for a message authentication code.

The N+1th header 121 includes a packet number for identifying the N+1th packet 120. The packet number included in the N+1th packet 120 is N+1.

The remaining message authentication code 206 is information for determining whether an Nth data block 202-N is a valid data block.

Figure 3:
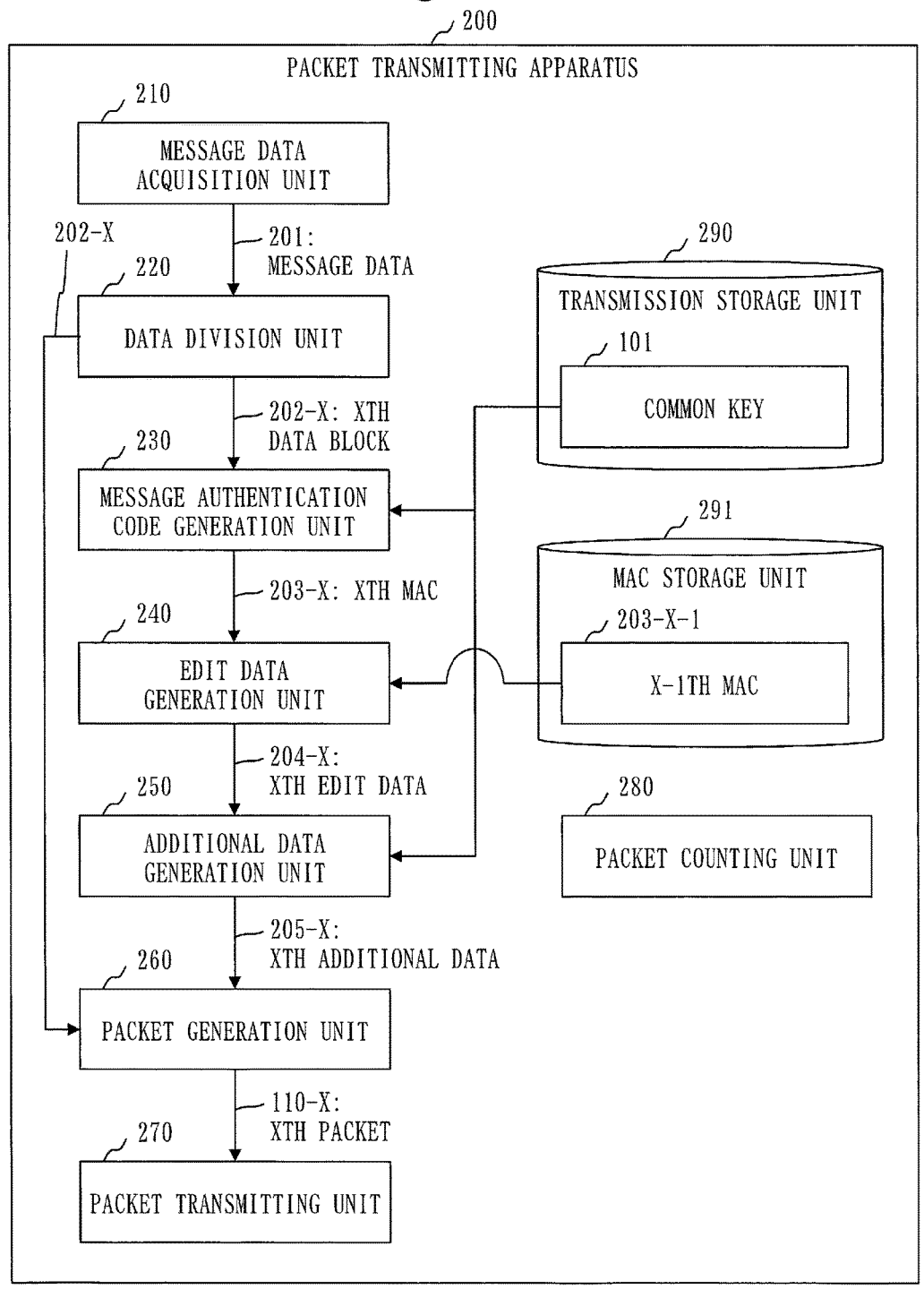
FIG. 3 is a functional configuration diagram of a packet transmitting apparatus 200 in the first embodiment.

A functional configuration of the packet transmitting apparatus 200 will be described, based on FIG. 3.

The packet transmitting apparatus 200 includes a message data acquisition unit 210, a data division unit 220, a message authentication code generation unit 230, an edit data generation unit 240, an additional data generation unit 250, a packet generation unit 260, and a packet transmitting unit 270.

The packet transmitting apparatus 200 further includes a packet counting unit 280, a transmission storage unit 290, and a message authentication code storage unit 291.

The message data acquisition unit 210 acquires the message data 201.

The data division unit 220 divides the message data 201 into N data blocks 202.

The message authentication code generation unit 230 generates, for each data block 202 included in the N data blocks 202, a message authentication code 203 of the data block 202.

An Xth message authentication code 203-X is the message authentication code of an Xth data block 202-X.

The Xth data block 202 is one data block out of from a second data block 202-2 to the Nth data block 202-N in the N data blocks 202.

The edit data generation unit 240 generates Xth edit data 204-X.

The Xth edit data 204-X is data generated using the Xth message authentication code 203-X and an X−1th message authentication code 203-X−1.

The additional data generation unit 250 generates Xth additional data 205-X using the Xth edit data 204-X.

The Xth additional data 205-X is data to be added to the Xth data block 202-X.

The packet generation unit 260 generates an Xth packet 110-X including an Xth header 111-X, the Xth data block 202-X, and the Xth additional data 205.

The packet transmitting unit 270 transmits the Xth packet 110-X.

The packet counting unit 280 counts a packet number (X).

The transmission storage unit 290 stores data that are used, generated, and input/output at the packet transmitting apparatus 200. A common key 101 and so on are stored in the transmission storage unit 290.

The message authentication code storage unit 291 stores the X−1th message authentication code 203-X−1.

Figure 4:
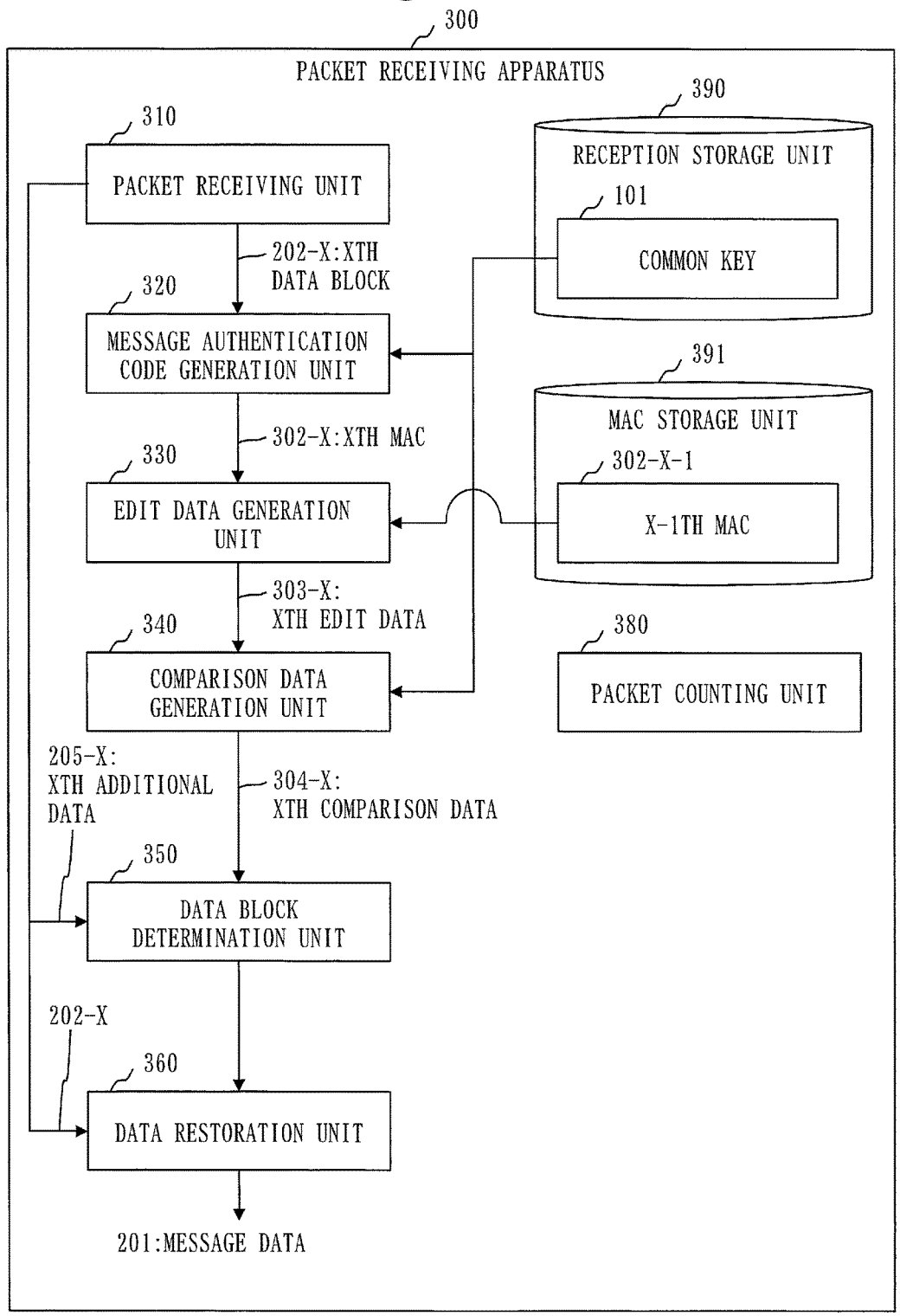
FIG. 4 is a functional configuration diagram of a packet receiving apparatus 300 in the first embodiment.

A functional configuration of the packet receiving apparatus 300 will be described, based on FIG. 4.

The packet receiving apparatus 300 includes a packet receiving unit 310, a message authentication code generation unit 320, an edit data generation unit 330, a comparison data generation unit 340, a data block determination unit 350, and a data restoration unit 360.

The packet receiving apparatus 300 further includes a packet counting unit 380, a reception storage unit 390, and a message authentication code storage unit 391.

The packet receiving unit 310 receives the Xth packet 110-X and an X−1th packet 110-X−1.

The message authentication code generation unit 320 generates an Xth message authentication code 302-X, using the Xth data block 202-X included in the Xth packet 110-X. The Xth message authentication code 302-X is a message authentication code 302 of the Xth data block 202-X.

The message authentication code generation unit 320 generates an X−1th message authentication code 302-X−1, using an X−1th data block 202-X−1 included in the X−1th packet 110-X−1. The X−1th message authentication code 302-X−1 is the message authentication code 302 of the X−1th data block 202-X.

The edit data generation unit 330 generates Xth edit data 303-X.

The Xth edit data 303-X is data generated using the Xth message authentication code 302-X and the X−1th message authentication code 302-X−1.

The comparison data generation unit 340 generates Xth comparison data 304-X using the Xth edit data 303-X.

The Xth comparison data 304-X is data to be added to the Xth data block 202-X.

The data block determination unit 350 compares the Xth comparison data 304-X with the Xth additional data 205-X, thereby determining whether the Xth data block 202-X is a valid data block 202.

The data restoration unit 360 restores the message data 201 by concatenating the first to Nth data blocks 202.

The packet counting unit 380 counts a packet number (X).

The reception storage unit 390 stores data that are used, generated, or input/output at the packet receiving apparatus 300. The common key 101 and so on are stored in the reception storage unit 390. This common key 101 is the same as the common key 101 to be used by the packet transmitting apparatus 200.

The message authentication code storage unit 391 stores the X−1th message authentication code 302-X−1.

Figure 5:
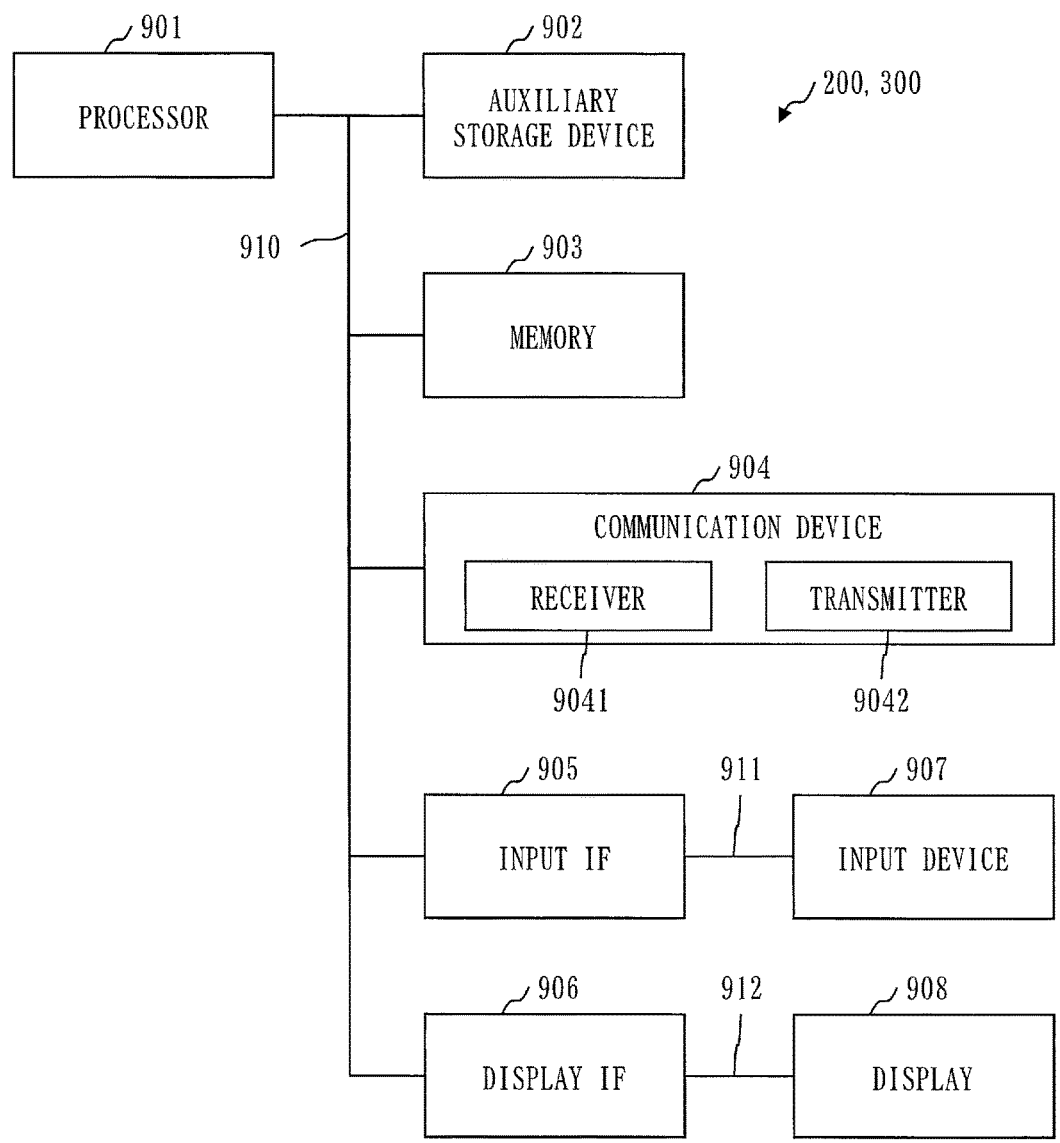
FIG. 5 is a hardware configuration diagram of each of the packet transmitting apparatus 200 and the packet receiving apparatus 300 in the first embodiment.

A hardware configuration example of each of the packet transmitting apparatus 200 and the packet receiving apparatus 300 will be described, based on FIG. 5.

Each of the packet transmitting apparatus 200 and the packet receiving apparatus 300 is a computer including hardware such as a processor 901, an auxiliary storage device 902, a memory 903, a communication device 904, an input interface 905, and a display interface 906.

The processor 901 is connected to the other hardware through a signal line 910. The input interface 905 is connected to an input device 907 through a cable 911. The display interface 906 is connected to a display 908 through a cable 912.

The processor 901 is an IC to perform processing, and controls the other hardware. The processor 901 is a CPU, a DSP, or a GPU, for example. The IC is an abbreviated name for an Integrated Circuit. The CPU is an abbreviated name for a Central Processing Unit. The DSP is an abbreviated name for a Digital Signal Processor, and the GPU is an abbreviated name for a Graphics Processing Unit.

The auxiliary storage device 902 is a ROM, a flash memory, or an HDD, for example. The ROM is an abbreviated name for a Read Only Memory, and the HDD is an abbreviated name for a Hard Disk Drive.

The memory 903 is a RAM, for example. The RAM is an abbreviated name for a Random Access Memory.

The communication device 904 includes a receiver 9041 to receive data and a transmitter 9042 to transmit the data. The communication device 904 is a communication chip or an NIC, for example. The NIC is an abbreviated name for a Network Interface Card.

The input interface 905 is a port to which the cable 911 is connected, and an example of the port is a terminal of USB. The USB is an abbreviated name for a Universal Serial Bus.

The display interface 906 is a port to which the cable 912 is connected, and a terminal of USB and a terminal of HDMI are each an example of the port. The HDMI (registered trademark) is an abbreviated name for a High Definition Multimedia Interface.

The input device 907 is a mouse, a keyboard, or a touch panel, for example.

The display 908 is an LCD, for example. The LCD is an abbreviated name for a Liquid Crystal Display.

An OS is stored in the auxiliary storage device 902. The OS is an abbreviated name for an Operation System.

A program to implement functions of "units" such as the message data acquisition unit 210, the data division unit 220, the message authentication code generation unit 230, the edit data generation unit 240, the additional data generation unit 250, the packet generation unit 260, and the packet transmitting unit 270 included in the packet transmitting apparatus 200 is stored in the auxiliary storage device 902 of the packet transmitting apparatus 200.

A program to implement functions of "units" such as the packet receiving unit 310, the message authentication code generation unit 320, the edit data generation unit 330, the comparison data generation unit 340, the data block determination unit 350, and the data restoration unit 360 included in the packet receiving apparatus 300 is stored in the auxiliary storage device 902 of the packet receiving apparatus 300.

At least a part of the OS is loaded into the memory 903, and the processor 901 executes the program to implement the functions of the "units" while executing the OS. The program to implement the functions of the "units" is loaded into the memory, is read into the processor 901, and is executed by the processor 901.

It may be so arranged that the packet transmitting apparatus 200 and the packet receiving apparatus 300 each include a plurality of the processors 901, and that the plurality of the processors 901 cooperate and execute the program to implement the functions of the "units".

Data, information, signal values, variable values, and the like indicating results of processes by the "units" are stored in the memory 903, the auxiliary storage device 902, a register in the processor 901, or a cache memory in the processor 901.

The "units" may be implemented by "circuitry". Each "unit" may be replaced by a "circuit", a "step", a "procedure", or a "process".

The "circuit" and the "circuitry" are each a concept including a processing circuit such as the processor 901, a logic IC, a GA, an ASIC, or an FPGA. The GA is an abbreviated name for a Gate Array, the ASIC is an abbreviated name for an Application Specific Integrated Circuit, and the FPGA is an abbreviated name for a Field-Programmable Gate Array.

Description of Operations

Operations of the packet communication system 100 correspond to a packet communication method, operations of the packet transmitting apparatus 200 correspond to a packet transmitting method, and operations of the packet receiving apparatus 300 correspond to a packet receiving method.

The packet communication method corresponds to a processing procedure of a packet communication program, the packet transmitting method corresponds to a processing procedure of a packet transmitting program, and the packet receiving method corresponds to a packet receiving program.

Based on FIG. 6, a description will be given about the packet transmitting method when N is 3.

"H" in the drawing indicates a MAC generating function. "∥" indicates concatenation, and "MAC (Y)" indicates the message authentication code of Yth edit data 204.

A first data block 202-1 and a packet number (1) are input to the MAC generating function to generate a first message authentication code 203-1.

An initial value (0) of the message authentication code 203 is concatenated with the first message authentication code 203-1 to generate first edit data 204-1.

The first edit data 204-1 is input to the MAC generating function to generate the message authentication code of the first edit data 204-1.

First additional data 205-1 is extracted from the message authentication code of the first edit data 204-1.

A first packet 110-1 including the first data block 202-1 and the first additional data 205-1 is generated. The first packet 110-1 is transmitted.

A second data block 202-2 and a packet number (2) are input to the MAC generating function to generate a second message authentication code 203-2.

The first message authentication code 203-1 is concatenated with the second message authentication code 203-2 to generate second edit data 204-2.

The second edit data 204-2 is input to the MAC generating function to generate the message authentication code of the second edit data 204-2.

Second additional data 205-2 is extracted from the message authentication code of the second edit data 204-2.

A second packet 110-2 including the second data block 202-2 and the second additional data 205-2 is generated. The second packet 110-2 is transmitted.

A third data block 202-3 and a packet number (3) are input to the MAC generating function to generate a third message authentication code 203-3.

The second message authentication code 203-2 is concatenated with the third message authentication code 203-3 to generate third edit data 204-3.

The third edit data 204-3 is input to the MAC generating function to generate the message authentication code of the third edit data 204-3.

Third additional data 205-3 is extracted from the message authentication code of the third edit data 204-3.

A third packet 110-3 including the third data block 202-3 and the third additional data 205-3 is generated. The third packet 110-3 is transmitted.

The remaining message authentication code 206 is extracted from the message authentication code of the third edit data 204-3.

A fourth packet is generated as the N+1th packet 120 including the remaining message authentication code 206. The fourth packet is transmitted.

A flow of processes of the packet transmitting method will be described, based on FIG. 7.

S110 is a message data acquisition process.

In S110, the message data 201 is input to the packet transmitting apparatus 200, using a user interface or the input device.

The message data acquisition unit 210 acquires the message data 201 input to the packet transmitting apparatus 200.

S120 is a data division process.

In S120, the data division unit 220 divides the message data 201 into the N data blocks 202.

S130 is a first data block process.

Based on FIG. 8, a description will be given about the first data block process (S130).

S131 is a message authentication code generation process.

In S131, the message authentication code generation unit 230 uses the first data block 202-1, the packet number (1), and the common key 101 as inputs to calculate the MAC generating function. This generates the first message authentication code 203-1. The MAC is an abbreviated name for a message authentication code.

The first message authentication code 203-1 is the message authentication code 203 of the first data block 202-1.

S132 is an edit data generation process.

In S132, the edit data generation unit 240 generates the first edit data 204-1 using the first message authentication code 203-1 and the initial value of the message authentication code 203.

The first edit data 204-1 is data obtained by concatenating the initial value of the message authentication code 203 with the first message authentication code 203-1. The initial value of the message authentication code 203 is all zero.

S133 is an additional data generation process.

In S133, the additional data generation unit 250 generates the first additional data 205-1 as follows, using the first edit data 204-1.

The additional data generation unit 250 calculates the MAC generating function using the first edit data 204-1 and the common key 101 as inputs. This generates the message authentication code of the first edit data 204-1. This MAC generating function is the same as the MAC generating function calculated in S131.

The additional data generation unit 250 generates the first additional data 205-1, using the message authentication code of the first edit data 204-1. The first additional data 205-1 is a portion extracted from the message authentication code of the first edit data 204-1.

The message authentication code of the first edit data 204-1 is a bit string of 256 bits, and the first additional data 205-1 is constituted from Y bits ($0<Y\leq256$) of the front part of the message authentication code of the first edit data 204-1.

S134 is a packet generation process.

In S134, the packet generation unit 260 generates the first packet 110-1 including the first header 111-1, the first data block 202-1, and the first additional data 205-1.

S135 is a packet transmission process.

In S135, the packet transmitting unit 270 transmits the first packet 110-1 to the packet receiving apparatus 300.

After S135, the first data block process (S130) is finished.

Returning to FIG. 7, the description will be continued from S140.

S140 is an Xth data block process.

The Xth data block process (S140) will be described, based on FIG. 9.

Processes from S141 to S145 are repetitively executed while a value of a variable X is from 2 to N. The initial value of the variable X is 2. The value of the variable X is incremented by 1 by the packet counting unit 280 each time the processes from S141 to S145 are executed.

S141 is a message authentication code generation process.

In S141, the message authentication code generation unit 230 calculates the MAC generating function, using the Xth data block 202-X and the common key 101 as inputs. This generates the Xth message authentication code 203-X. This MAC generating function is the same as the MAC generating function calculated in S131 (see FIG. 8).

S142 is an edit data generation process.

In S142, the edit data generation unit 240 generates the Xth edit data 204-X using the Xth message authentication code 203-X and the X−1th message authentication code 203-X−1.

The Xth edit data 204-X is data obtained by concatenating the X−1th message authentication code 203-X−1 with the Xth message authentication code 203-X.

S143 is an additional data generation process.

In S143, the additional data generation unit 250 generates the Xth additional data 205-X as follows, using the Xth edit data 204-X.

The additional data generation unit 250 calculates the MAC generating function using the Xth edit data 204-X and the common key 101 as inputs. This generates the message authentication code of the Xth edit data 204-X. This MAC generating function is the same as the MAC generating function calculated in S131 (see FIG. 8).

The additional data generation unit 250 generates the Xth additional data 205-X using the message authentication code of the Xth edit data 204-X. The Xth additional data 205-X is a portion extracted from the message authentication code of the Xth edit data 204-X.

The message authentication code of the Xth edit data 204-X is a bit string of 256 bits, and the Xth additional data 205-X is constituted from Y bits ($0<Y\leq256$) of the front part of the message authentication code of the Xth edit data 204-X.

S144 is a packet generation process.

In S144, the packet generation unit 260 generates the Xth packet 110-X including the Xth header 111-X, the Xth data block 202-X, and the Xth additional data 205-X.

S145 is a packet transmission process.

In S145, the packet transmitting unit 270 transmits the Xth packet 110-X to the packet receiving apparatus 300.

Returning to FIG. 7, the description will be continued from S150.

S150 is a remaining message authentication code process.

Figure 10:
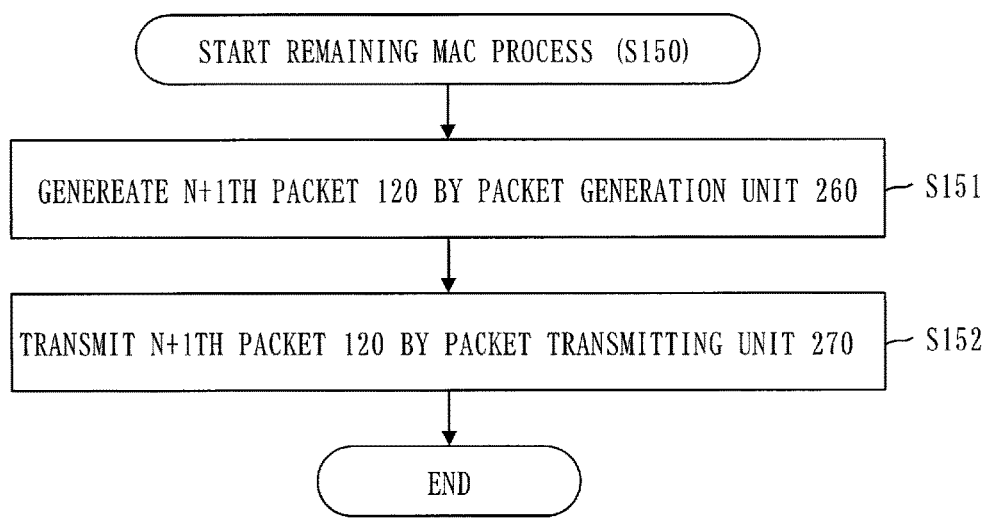
FIG. 10 is a flowchart of a remaining MAC process (S150) in the first embodiment.

The remaining message authentication code process (S150) will be described, based on FIG. 10.

S151 is a packet generation process.

In S151, the packet generation unit 260 generates the N+1th packet 120 including the N+1th header 121 and the remaining message authentication code 206.

The remaining message authentication code 206 is a portion obtained by excluding Nth additional data 205-N from the message authentication code of Nth edit data 204-N.

Figure 9:
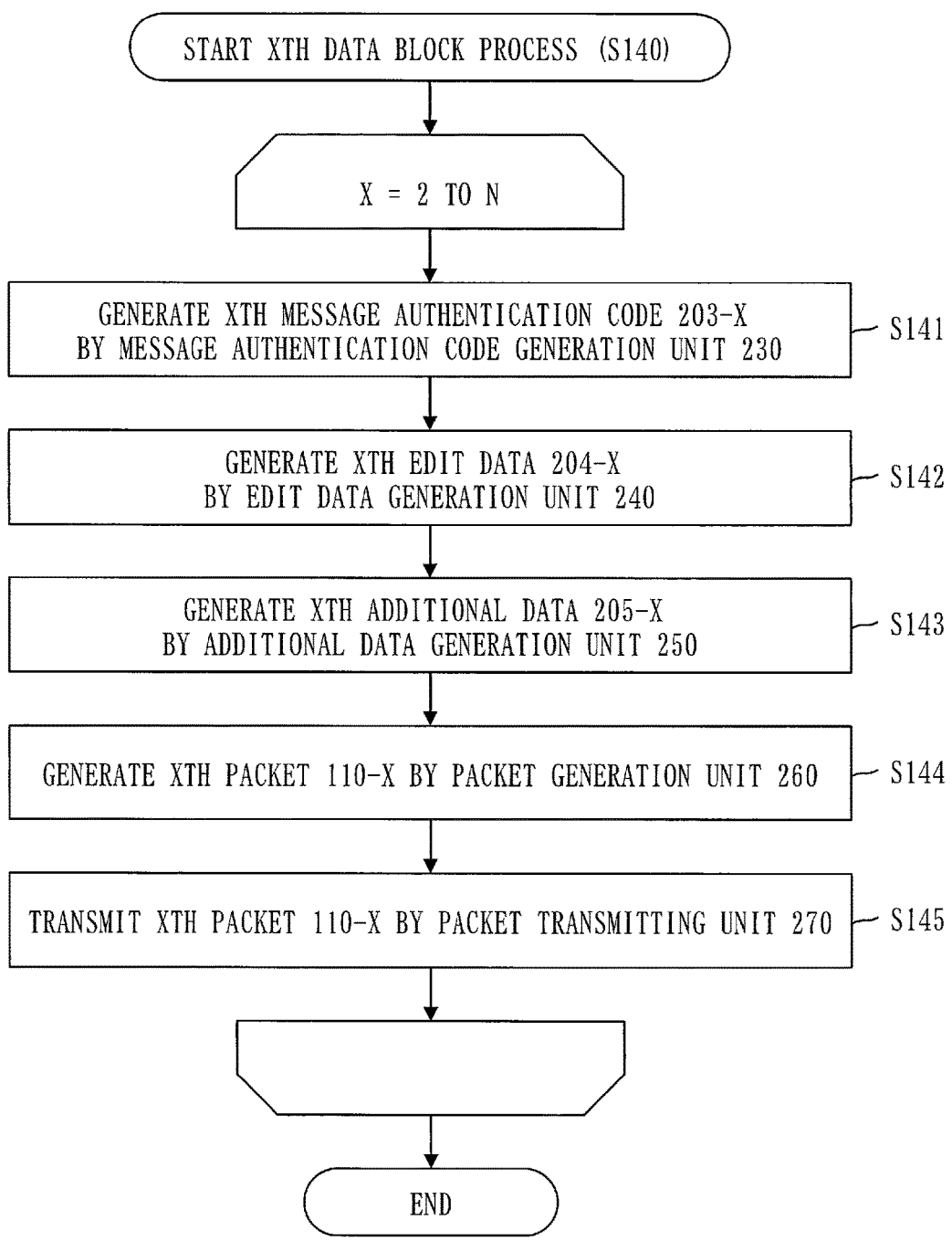
FIG. 9 is a flowchart of an Xth data block process (S140) in the first embodiment.

The message authentication code of the Nth edit data 204-N and the Nth additional data 205-N are generated when the value of the variable X is N in S143 (see FIG. 9).

That is, the remaining message authentication code 206 is constituted from Y bits ($0<Y\leq256$) of the latter part of the message authentication code of the Nth edit data 204-N.

S152 is a packet transmitting process.

In S152, the packet transmitting unit 270 transmits the N+1th packet 120 to the packet receiving apparatus 300.

After S152, the remaining message authentication code process (S150) is finished.

Based on FIG. 11, a description will be given about the packet receiving method when N is three.

The first packet 110-1 including the first data block 202-1 and the first additional data 205-1 is received.

The first data block 202-1 and the packet number (1) are input to the MAC generating function to generate a first message authentication code 302-1.

The initial value (0) of the message authentication code 302 is concatenated with the first message authentication code 302-1 to generate first edit data 303-1.

The first edit data 303-1 is input to the MAC generating function to generate the message authentication code of the first edit data 303-1.

First comparison data 304-1 is extracted from the message authentication code of the first edit data 303-1.

The first comparison data 304-1 is compared with the first additional data 205-1.

The second packet 110-2 including the second data block 202-2 and the second additional data 205-2 is received.

The second data block 202-2 and the packet number (2) are input to the MAC generating function to generate a second message authentication code 302-2.

The first message authentication code 302-1 is concatenated with the second message authentication code 302-2 to generate second edit data 303-2.

The second edit data 303-2 is input to the MAC generating function to generate the message authentication code of the second edit data 303-2.

Second comparison data 304-2 is extracted from the message authentication code of the second edit data 303-2.

The second comparison data 304-2 is compared with the second additional data 205-2.

The third packet 110-3 including the third data block 202-3 and the third additional data 205-3 is received.

The third data block 202-3 and the packet number (3) are input to the MAC generating function to generate a third message authentication code 302-3.

The second message authentication code 302-2 is concatenated with the third message authentication code 302-3 to generate third edit data 303-3.

The third edit data 303-3 is input to the MAC generating function to generate the message authentication code of the third edit data 303-3.

Third comparison data 304-3 is extracted from the message authentication code of the third edit data 303-3.

The third comparison data 304-3 is compared with the third additional data 205-3.

The fourth packet including the remaining message authentication code 206 is received as the N+1th packet 120.

Remaining comparison data 305 is extracted from the message authentication code of the third edit data 303-3.

The remaining comparison data 305 is compared with the remaining message authentication code 206.

A flow of processes of the packet receiving method will be described, based on FIG. 12.

S210 is a packet receiving process.

In S210, the packet receiving unit 310 receives the first to Nth packets 110.

S220 is a first data block process.

The first data block process (S220) will be described, based on FIG. 13.

S221 is a message authentication code generation process.

In S221, the message authentication code generation unit 320 calculates the MAC generating function, using the first data block 202-1, the packet number (1), and the common key 101 as inputs. This generates the first message authentication code 302-1. This MAC generating function is the same as the MAC generating function calculated in S131 (see FIG. 8).

The first message authentication code 302-1 is the message authentication code 302 of the first data block 202-1.

S222 is an edit data generation process.

In S222, the edit data generation unit 330 generates the first edit data 303-1, using the first message authentication code 302-1 and the initial value of the message authentication code 302.

The first edit data 303-1 is data obtained by concatenating the initial value of the first the message authentication code 302 with the first message authentication code 302-1. The initial value of the message authentication code 302 is all zero.

S223 is a comparison data generation process.

In S223, the comparison data generation unit 340 generates the first comparison data 304-1 as follows, using the first edit data 303-1.

The comparison data generation unit 340 calculates the MAC generating function, using the first edit data 303-1 and the common key 101 as inputs. This generates the message authentication code of the first edit data 303-1. This MAC generating function is the same as the MAC generating function calculated in S133 (see FIG. 8).

The comparison data generation unit 340 generates the first comparison data 304-1, using the message authentication code of the first edit data 303-1. The first comparison data 304-1 is a portion extracted from the message authentication code of the first edit data 303-1.

The message authentication code of the first edit data 303-1 is a bit string of 256 bits, and the first comparison data 304-1 is constituted from Y bits ($0 < Y \leq 256$) of the front part of the message authentication code of the first edit data 303-1.

S224 is a data block determination process.

In S224, the data block determination unit 350 compares the first comparison data 304-1 with the first additional data 205-1 included in the first packet 110-1.

Then, the data block determination unit 350 determines whether the first data block 202-1 included in the first packet 110-1 is a valid data block 202, based on a result of the comparison.

If the first comparison data 304-1 is the same as the first additional data 205-1, the first data block 202-1 is the valid data block 202.

If the first comparison data 304-1 is different from the first additional data 205-1, the first data block 202-1 is an invalid data block 202.

After S224, the first data block process (S220) is finished.

Returning to FIG. 12, the processes after S220 will be described.

If the first data block 202-1 has been the invalid data block 202, the processes of the packet receiving method are finished.

If the first data block 202-1 has been the valid data block 202, the procedure proceeds to S230.

S230 is an Xth data block process.

The Xth data block process (S230) will be described, based on FIG. 14.

The processes from S231 to S234 are repetitively executed while the value of the variable X is from 2 to N. The initial value of the variable X is 2. The value of the variable X is incremented by 1 by the packet counting unit 380 each time the processes from S231 to S234 are executed.

S231 is a message authentication code generation process.

In S231, the message authentication code generation unit 320 calculates the MAC generating function, using the Xth data block 202-X and the common key 101 as inputs. This generates the Xth message authentication code 302-X. This MAC generating function is the same as the MAC generating function calculated in S141 (see FIG. 9).

S232 is an edit data generation process.

In S232, the edit data generation unit 330 generates the Xth edit data 303-X, using the Xth message authentication code 302-X and the X−1th message authentication code 302-X−1.

The Xth edit data 303-X is data obtained by concatenating the X−1th message authentication code 302-X−1 with the Xth message authentication code 302-X.

S233 is a comparison data generation process.

In S233, the comparison data generation unit 340 generates the Xth comparison data 304-X as follows, using the Xth edit data 303-X.

The comparison data generation unit 340 calculates the MAC generating function, using the Xth edit data 303-X and the common key 101 as inputs. This generates the message authentication code of the Xth edit data 303-X. This MAC generating function is the same as the MAC generating function calculated in S143 (see FIG. 9).

The comparison data generation unit 340 generates the Xth comparison data 304-X, using the message authentication code of the Xth edit data 303-X. The Xth comparison data 304-X is a portion extracted from the message authentication code of the Xth edit data 303-X.

The message authentication code of the Xth edit data 303-X is a bit string of 256 bits, and the Xth comparison data 304-X is constituted from Y bits (0<Y≤256) of the front part of the message authentication code of the Xth edit data 303-X.

S234 is a data block determination process.

In S234, the data block determination unit 350 compares the Xth comparison data 304-X with the Xth additional data 205-X included in the Xth packet 110-X.

Then, the data block determination unit 350 determines whether the Xth data block 202-X included in the Xth packet 110-X is a valid data block 202, based on a result of the comparison.

If the Xth comparison data 304-X is the same as the Xth additional data 205-X, the Xth data block 202-X is the valid data block 202.

If the Xth comparison data 304-X is different from the Xth additional data 205-X, the Xth data block 202-X is an invalid data block 202.

In this case, the Xth data block process (S230) is finished.

Returning to FIG. 12, the processes after S230 will be described.

If the Xth data block 202-X has been the invalid data block 202, the processes of the packet receiving method are finished.

If the Xth data block 202-X has been the valid data block 202, the procedure proceeds to S240.

S240 is a data block determination process.

In S240, the data block determination unit 350 compares remaining comparison data with the remaining message authentication code 206 included in the N+1th packet 120. The remaining comparison data will be described later.

Then, the data block determination unit 350 determines whether the Nth data block 202-N included in the Nth packet 110-N is a valid data block 202, based on a result of the comparison.

If the remaining comparison data is the same as the message authentication code 206, the Nth data block 202-N is the valid data block 202.

If the remaining comparison data is different from the remaining message authentication code 206, the Nth data block 202-N is an invalid data block 202.

The remaining comparison data is a portion obtained by excluding Nth comparison data 304-N from the message authentication code of Nth edit data 303-N.

Figure 14:
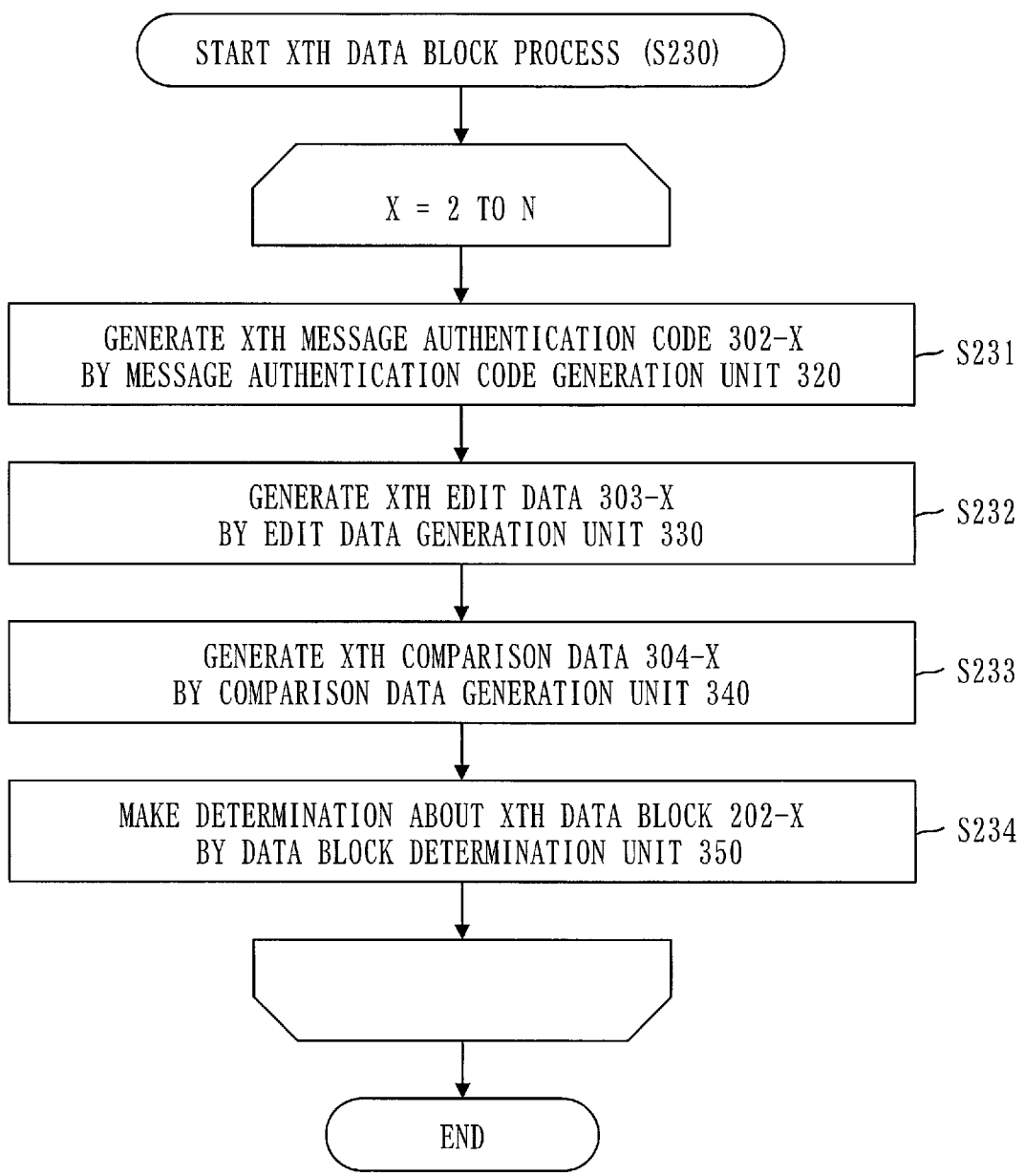
FIG. 14 is a flowchart of an Xth data block process (S230) in the first embodiment.

The message authentication code of the Nth edit data 303-N and the Nth comparison data 304-N are generated when the value of the variable X is N in S233 (see FIG. 14).

That is, the remaining comparison data is constituted from Y bits (0<Y≤256) of the latter part of the message authentication code of the Nth edit data 303-N.

If the Nth data block 202-N has been the invalid data block 202, the processes of the packet receiving method are finished.

If the Nth data block 202-N has been the valid data block 202, the procedure proceeds to S250.

S250 is a data restoration process.

In S250, the data restoration unit 360 restores the message data 201 by concatenating the first to the Nth data blocks 202.

Description of Effects

The Xth data block 202-X may be verified by adding, to the Xth data block 202-X, the Xth additional data 205-X based on the Xth data block 202-X and the X−1th data block 202-X−1.

This may cut down a portion of the message authentication code of the Xth edit data 204-X from the Xth additional data 205-X to reduce the size of the Xth additional data 205-X and may enhance a detection rate of falsification of the Xth data block 202-X, thereby improving security of packet communication.

The embodiment is particularly effective for a secure system in which, by using narrow-band communication, a construction cost is desired to be reduced, or a secure system in which reduction of a communication load and power consumption is required for reducing a maintenance cost. As examples of standards for the narrow-band communication, there are provided Z-wave and ZigBee. 9.6 kbps and 20 kbps are defined as minimum bandwidths in the respective standards.

As an example of a system for which the embodiment is particularly effective, there may be pointed out a system constituted from a sensor to monitor operating states of apparatuses in a factory, a plant, and a construction site and a server to aggregate data of those apparatuses. In addition to that system, there may be pointed out a system where small data limited by an application for communication between vehicle-mounted apparatuses, energy management of a building or the like are intermittently or continuously transmitted or received by a large number of devices. Further, there may be pointed out a sensor node network system in which energy harvesting or wireless power transmission is performed.

Second Embodiment

An embodiment where a method of generating edit data 204 is different from the first embodiment will be described, based on FIGS. 15 to 24. The description of an overlap with the first embodiment will be, however, omitted.

Description of Configuration

Figure 15:
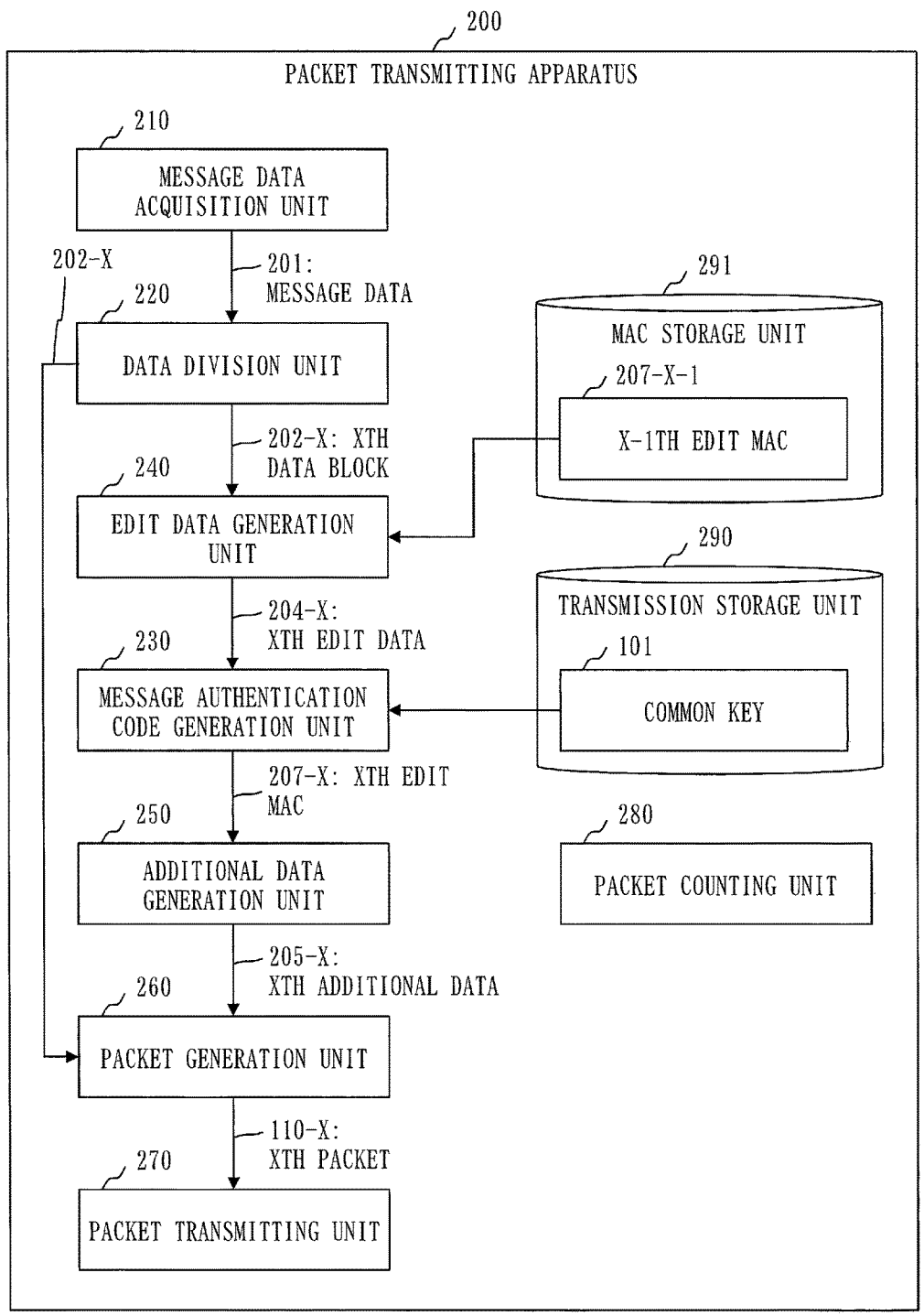
FIG. 15 is a functional configuration diagram of the packet transmitting apparatus 200 in a second embodiment.

A functional configuration of the packet transmitting apparatus 200 will be described, based on FIG. 15.

The edit data generation unit 240 generates Xth edit data 204-X, using an Xth data block 202-X and an X−1th edit MAC 259-X−1.

The message authentication code generation unit 230 generates an Xth edit MAC 207-X. The Xth edit MAC 207-X is the message authentication code of the Xth edit data 204-X.

The additional data generation unit 250 extracts a portion of the Xth edit MAC 207-X as Xth additional data 205-X.

Figure 16:
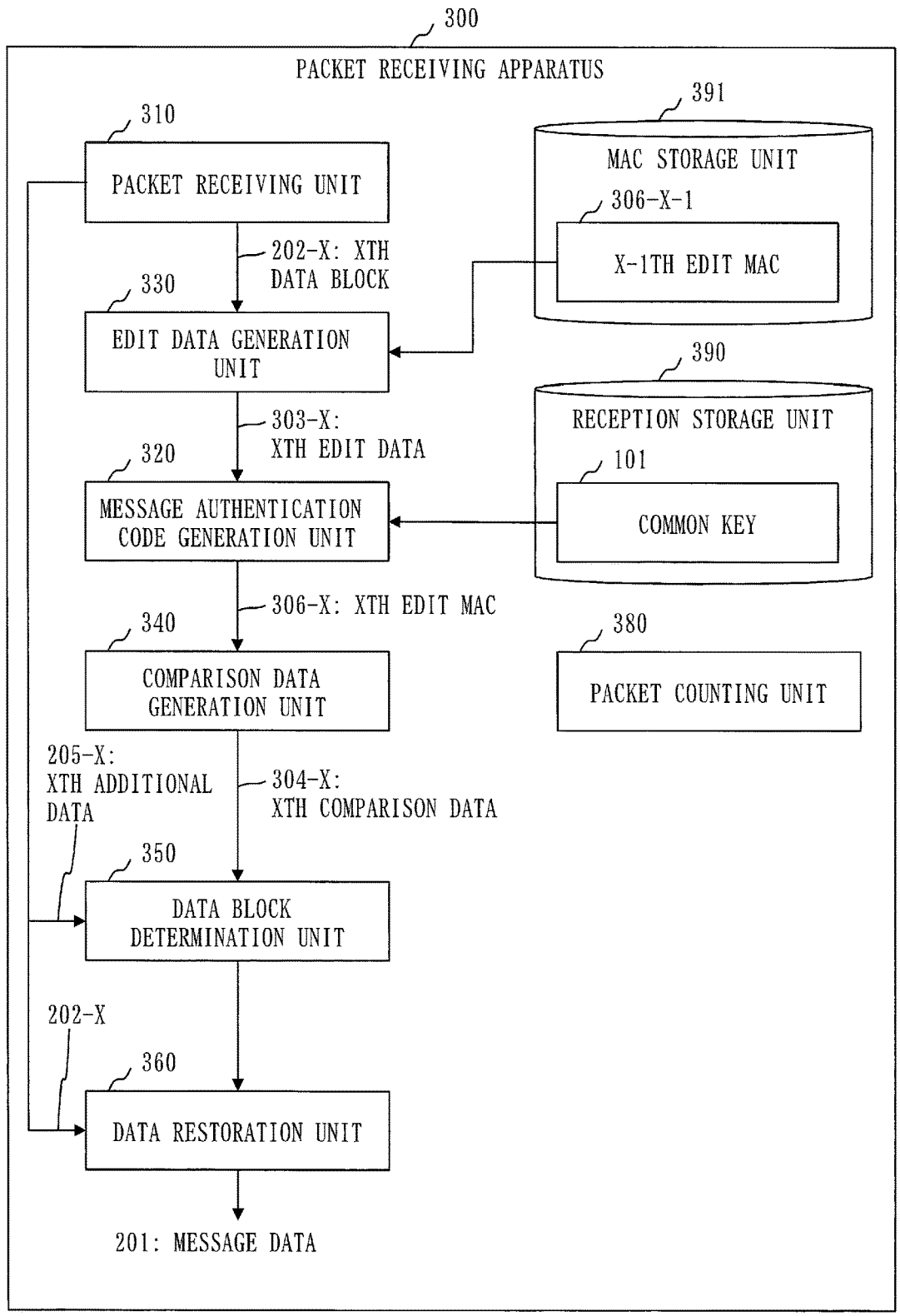
FIG. 16 is a functional configuration diagram of the packet receiving apparatus 300 in the second embodiment.

A functional configuration of the packet receiving apparatus 300 will be described, based on FIG. 16.

The edit data generation unit 330 generates Xth edit data 303-X, using the Xth data block 202-X and an X−1th edit MAC 306-X−1.

The message authentication code generation unit 320 generates an Xth edit MAC 306-X. The Xth edit MAC 306-X is the message authentication code of the Xth edit data 303-X.

The comparison data generation unit 340 extracts a portion of the Xth edit MAC 306-X, as Xth comparison data 304-X.

Description of Operations

A packet transmitting method when N is 3 will be described, based on FIG. 17.

A packet number (1) and an initial value (0) of an edit MAC 207 are concatenated with a first data block 202-1 to generate first edit data 204-1.

The first edit data 204-1 is input to a MAC generating function to generate a first edit MAC 207-1.

First additional data 205-1 is extracted from the first edit MAC 207-1.

A first packet 110-1 including the first data block 202-1 and the first additional data 205-1 is generated. The first packet 110-1 is transmitted.

A packet number (2) and the first edit MAC 207-1 are concatenated with a second data block 202-2 to generate second edit data 204-2.

The second edit data 204-2 is input to the MAC generating function to generate a second edit MAC 207-2.

Second additional data 205-2 is extracted from the second edit MAC 207-2.

A second packet 110-2 including the second data block 202-2 and the second additional data 205-2 is generated. The second packet 110-2 is transmitted.

A packet number (3) and the second edit MAC 207-2 are concatenated with a third data block 202-3 to generate third edit data 204-3.

The third edit data 204-3 is input to the MAC generating function to generate a third edit MAC 207-3.

Third additional data 205-3 is extracted from the third edit MAC 207-3.

A third packet 110-3 including the third data block 202-3 and the third additional data 205-3 is generated. The third packet 110-3 is transmitted.

A remaining message authentication code 206 is extracted from the third edit MAC 207-3.

A fourth packet is generated as an N+1th packet including the remaining message authentication code 206. The fourth packet is transmitted.

Figure 18:
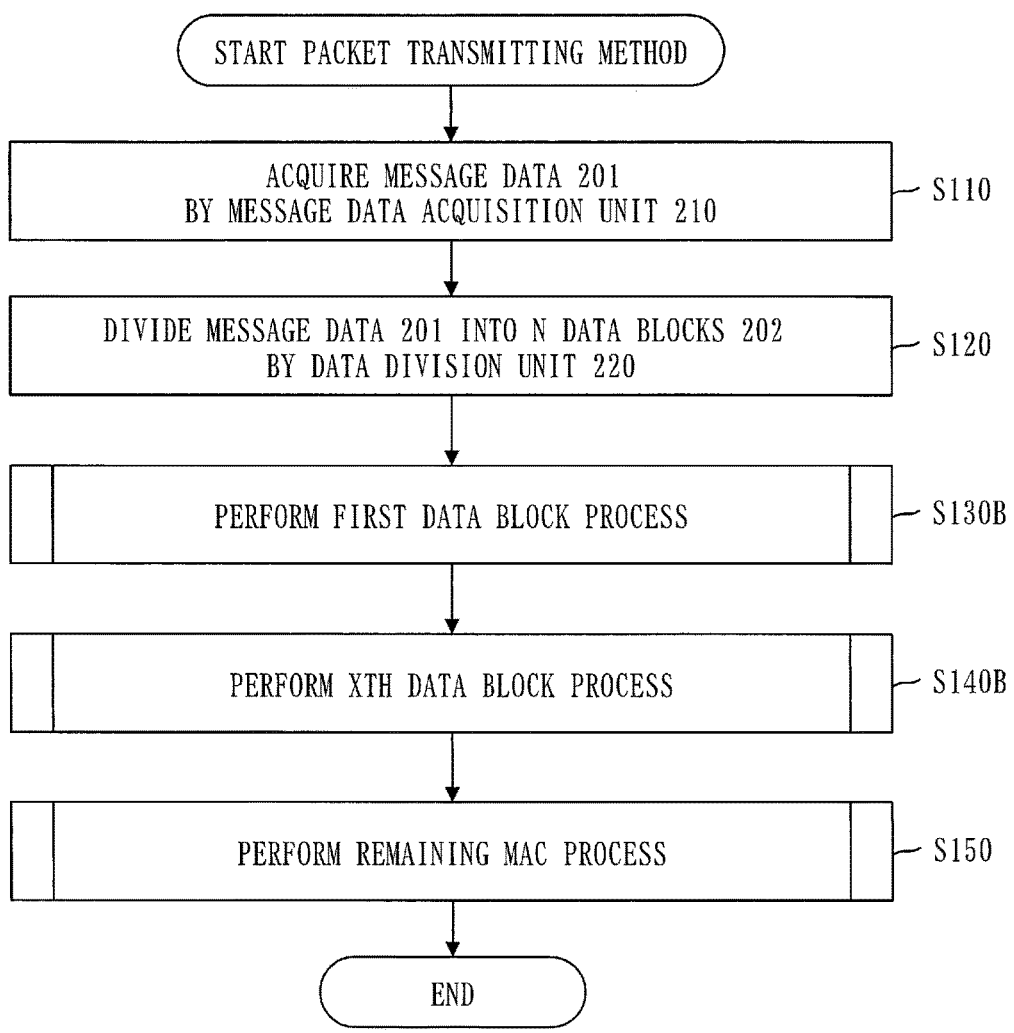
FIG. 18 is a flowchart of the packet transmitting method in the second embodiment.

A flow of processes of the packet transmitting method will be described, based on FIG. 18.

Figure 7:
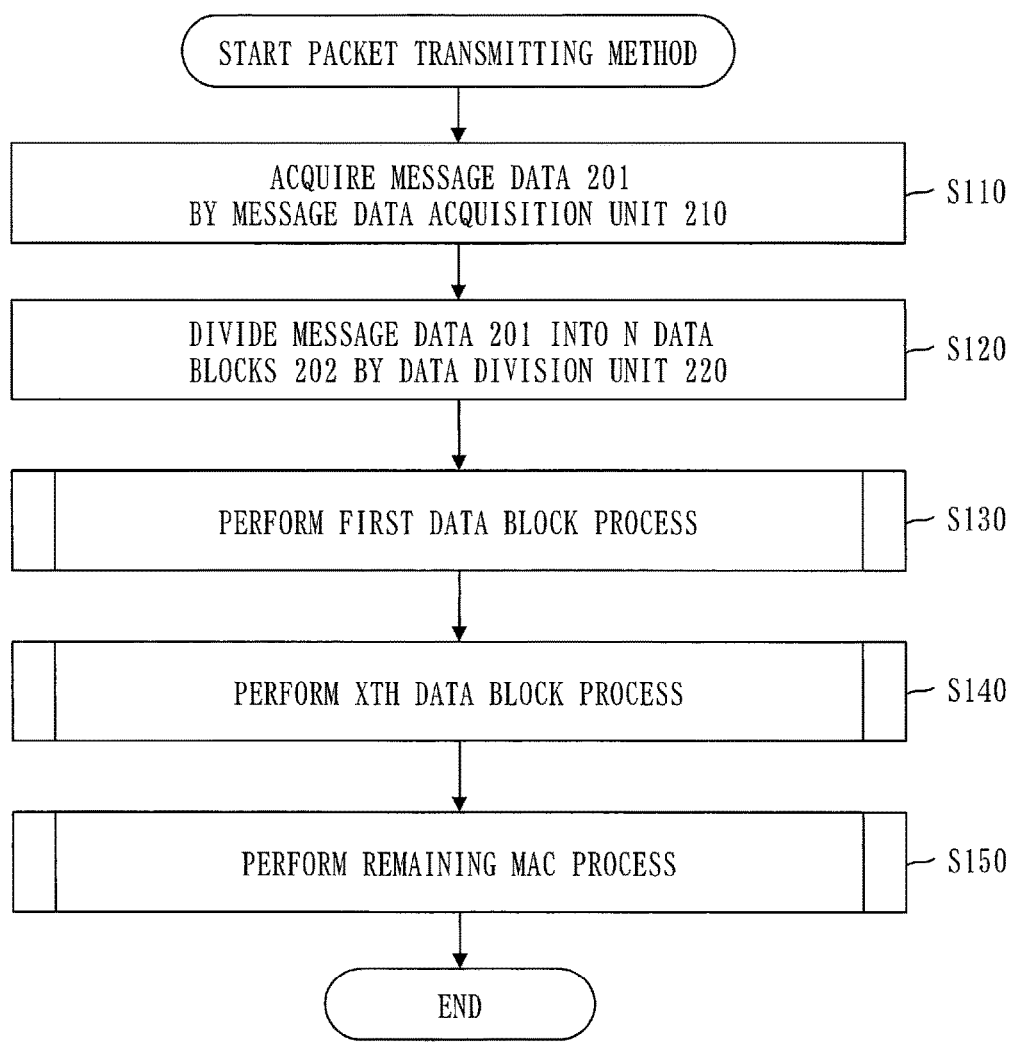
FIG. 7 is a flowchart of the packet transmitting method in the first embodiment.

The flow of the processes of a message transmitting method is the same as that in the first embodiment (see FIG. 7).

The message data acquisition process (S110), the data division process (S120), and the remaining MAC process (S150) are the same as those in the first embodiment.

Hereinafter, a description will be given about a first data block process (S130B) and an Xth data block process (S140B).

Figure 19:
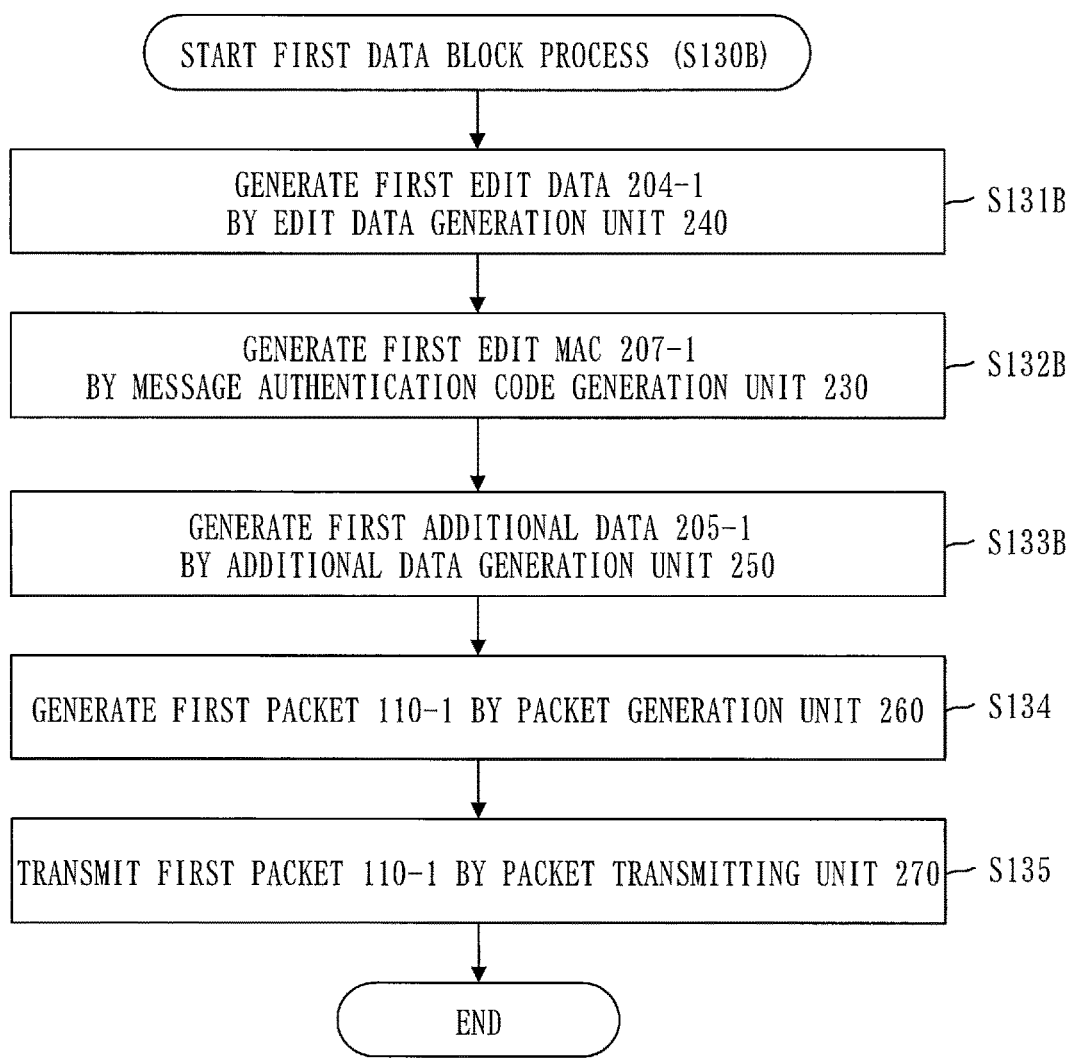
FIG. 19 is a flowchart of a first data block process (S130B) in the second embodiment.

The first data block process (S130B) will be described, based on FIG. 19.

In S131B, the edit data generation unit 240 generates the first edit data 204-1, using the first data block 202-1 and the initial value of the edit MAC 207.

The first edit data 204-1 is data obtained by concatenating the initial value of the edit MAC 207 with the first data block 202-1. The initial value of the edit MAC 207 is all zero.

In S132B, the message authentication code generation unit 230 calculates the MAC generating function, using the first edit data 204-1 and the common key 101 as inputs. This generates the first edit MAC 207-1.

The first edit MAC 207-1 is the message authentication code of the first edit data 204-1.

In S133B, the additional data generation unit 250 extracts Y bits ($0 < Y \leq 256$) at the beginning of the first edit data MAC 207-1, as the first additional data 205-1.

Figure 8:
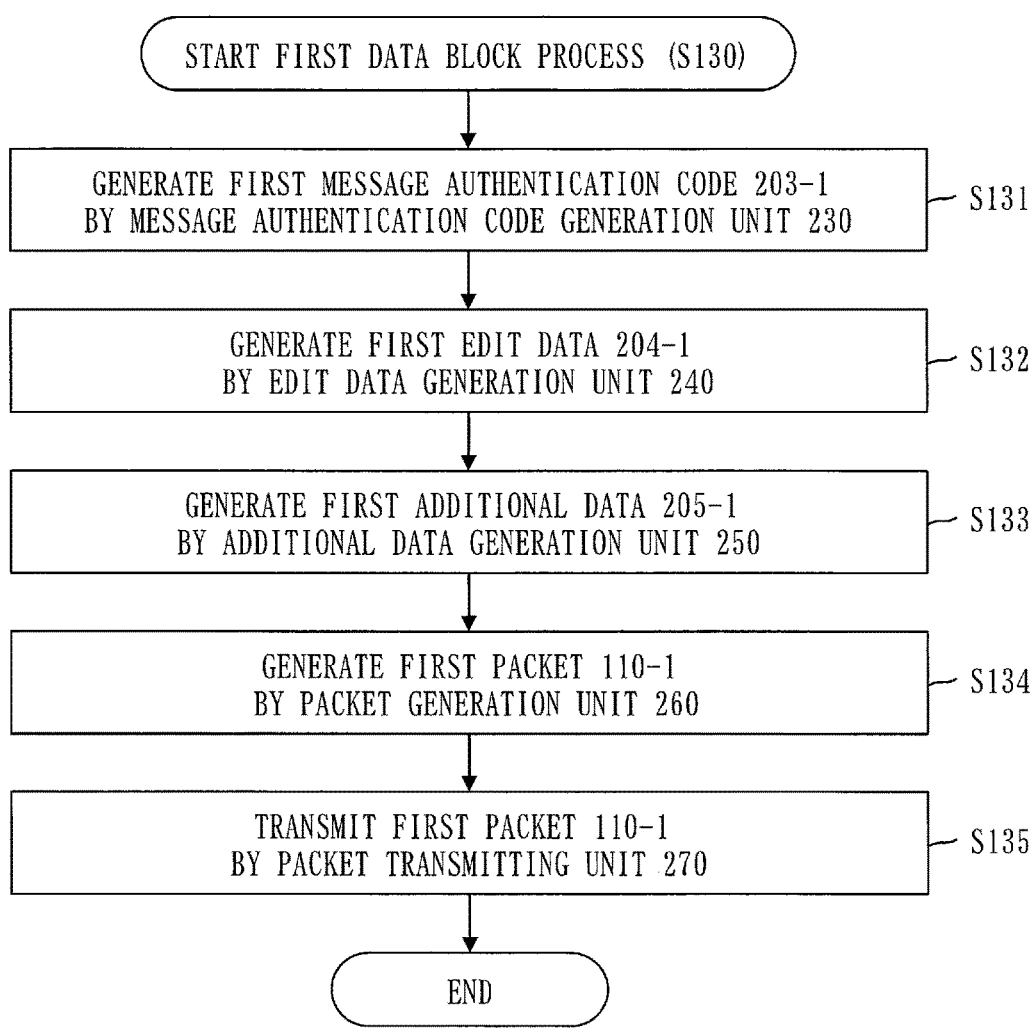
FIG. 8 is a flowchart of a first data block process (S130) in the first embodiment.

S134 and S135 are the same as those in the first embodiment (see FIG. 8).

Figure 20:
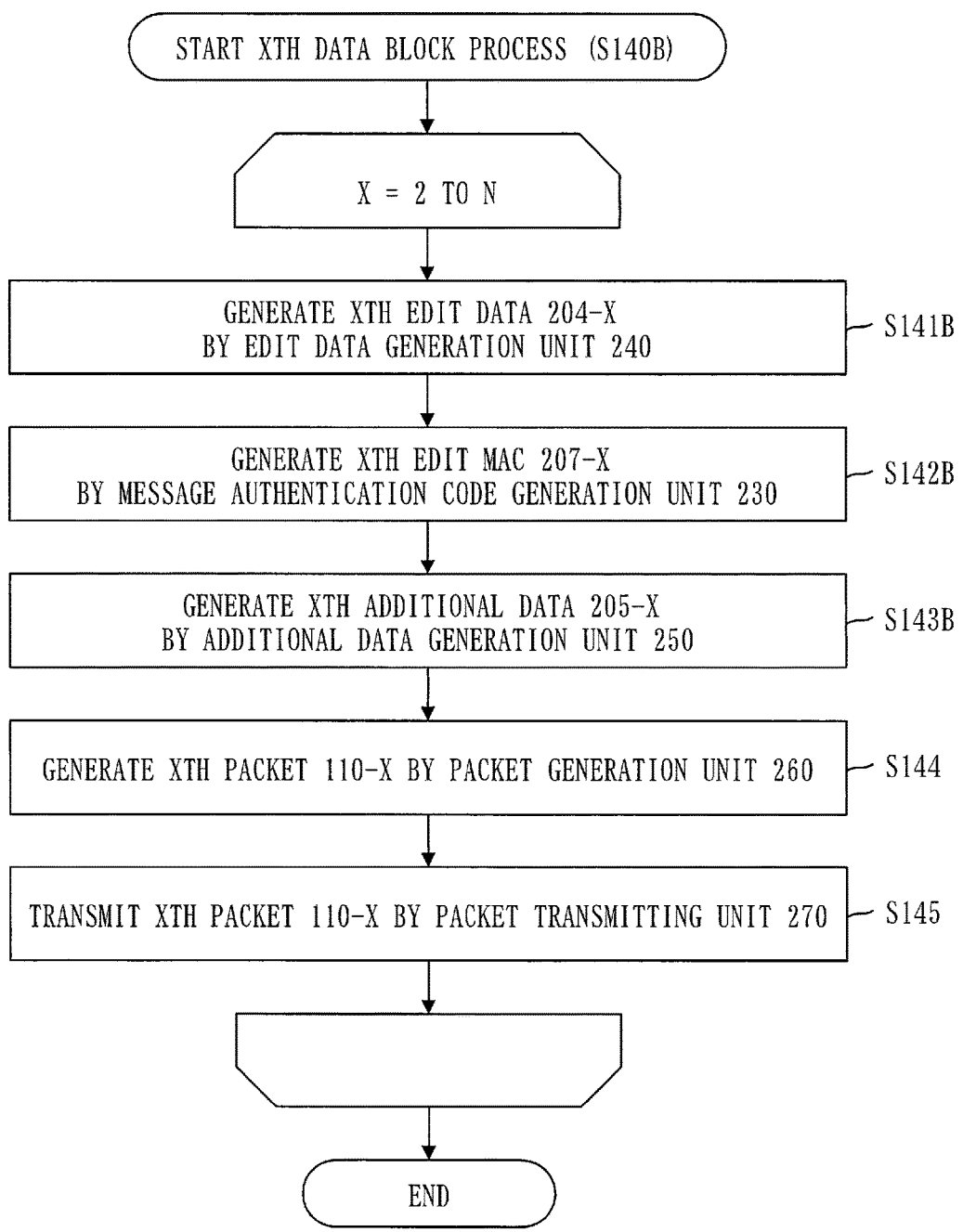
FIG. 20 is a flowchart of an Xth data block process (S140B) in the second embodiment.

The Xth data block process (S140B) will be described, based on FIG. 20.

In S141B, the edit data generation unit 240 generates the Xth edit data 204-X, using the Xth data block 202-X and the X−1th edit MAC 207-X−1.

The Xth edit data 204-X is data obtained by concatenating a packet number (X) and the X−1th edit MAC 207-X−1 with the Xth data block 202-X.

In S142B, the message authentication code generation unit 230 calculates the MAC generating function, using the Xth edit data 204-X and the common key 101 as inputs. This generates the Xth edit MAC 207-X.

The Xth edit MAC 207-X is the message authentication code of the Xth edit data 204-X.

In S143B, the additional data generation unit 250 extracts Y bits ($0 < Y \leq 256$) at the beginning of the Xth edit data 204-X, as the Xth additional data 205-X.

S144 and S145 are the same as those in the first embodiment (see FIG. 8).

A packet receiving method when N is 3 will be described, based on FIG. 21.

The first packet 110-1 including the first data block 202-1 and the first additional data 205-1 is received.

The packet number (1) and the initial value (0) of an edit MAC 306 are concatenated with the first data block 202-1 to generate first edit data 303-1.

The first edit data 303-1 is input to the MAC generating function to generate a first edit MAC 306-1.

First comparison data 304-1 is extracted from the first edit MAC 306-1.

The first comparison data 304-1 is compared with the first additional data 205-1.

The second packet 110-2 including the second data block 202-2 and the second additional data 205-2 is received.

The packet number (2) and the first edit MAC 306-1 are concatenated with the second data block 202-2 to generate second edit data 303-2.

The second edit data 303-2 is input to the MAC generating function to generate a second edit MAC 306-2.

Second comparison data 304-2 is extracted from the second edit MAC 306-2.

The second comparison data 304-2 is compared with the second additional data 205-2.

The third packet 110-3 including the third data block 202-3 and the third additional data 205-3 is received.

The packet number (3) and the second edit MAC 306-2 are concatenated with the third data block 202-3 to generate third edit data 303-3.

The third edit data 303-3 is input to the MAC generating function to generate a third edit MAC 306-3.

Third comparison data 304-3 is extracted from the third edit MAC 306-3.

The third comparison data 304-3 is compared with the third additional data 205-3.

The fourth packet including the remaining message authentication code 206 is received as the N+1th packet 120.

Remaining comparison data 305 is extracted from the message authentication code of the third edit MAC 306-3.

The remaining comparison data 305 is compared with the remaining message authentication code 206.

Figure 22:
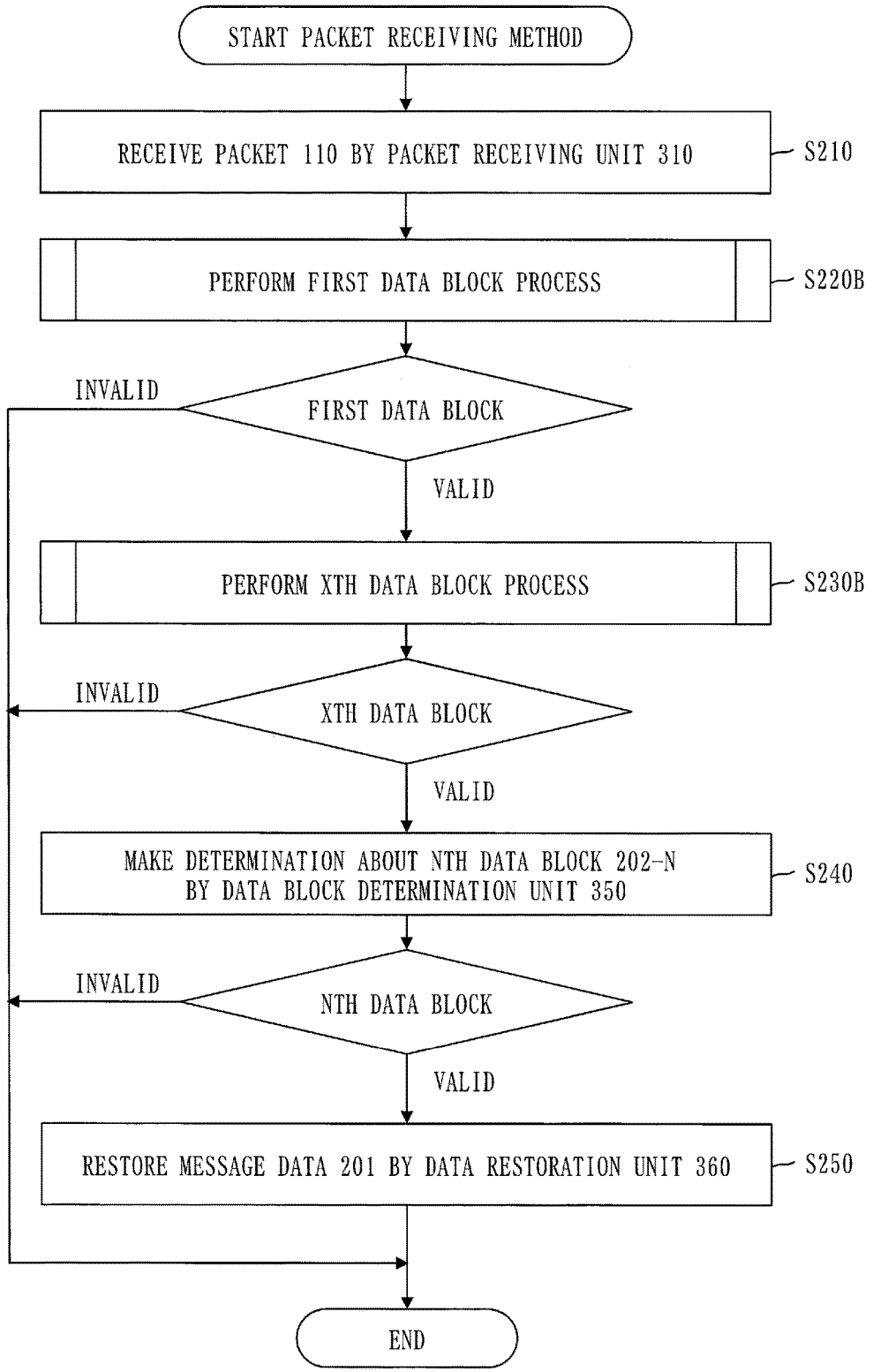
FIG. 22 is a flowchart of the packet receiving method in the second embodiment.

A flow of processes of the packet receiving method will be described, based on FIG. 22.

Figure 12:
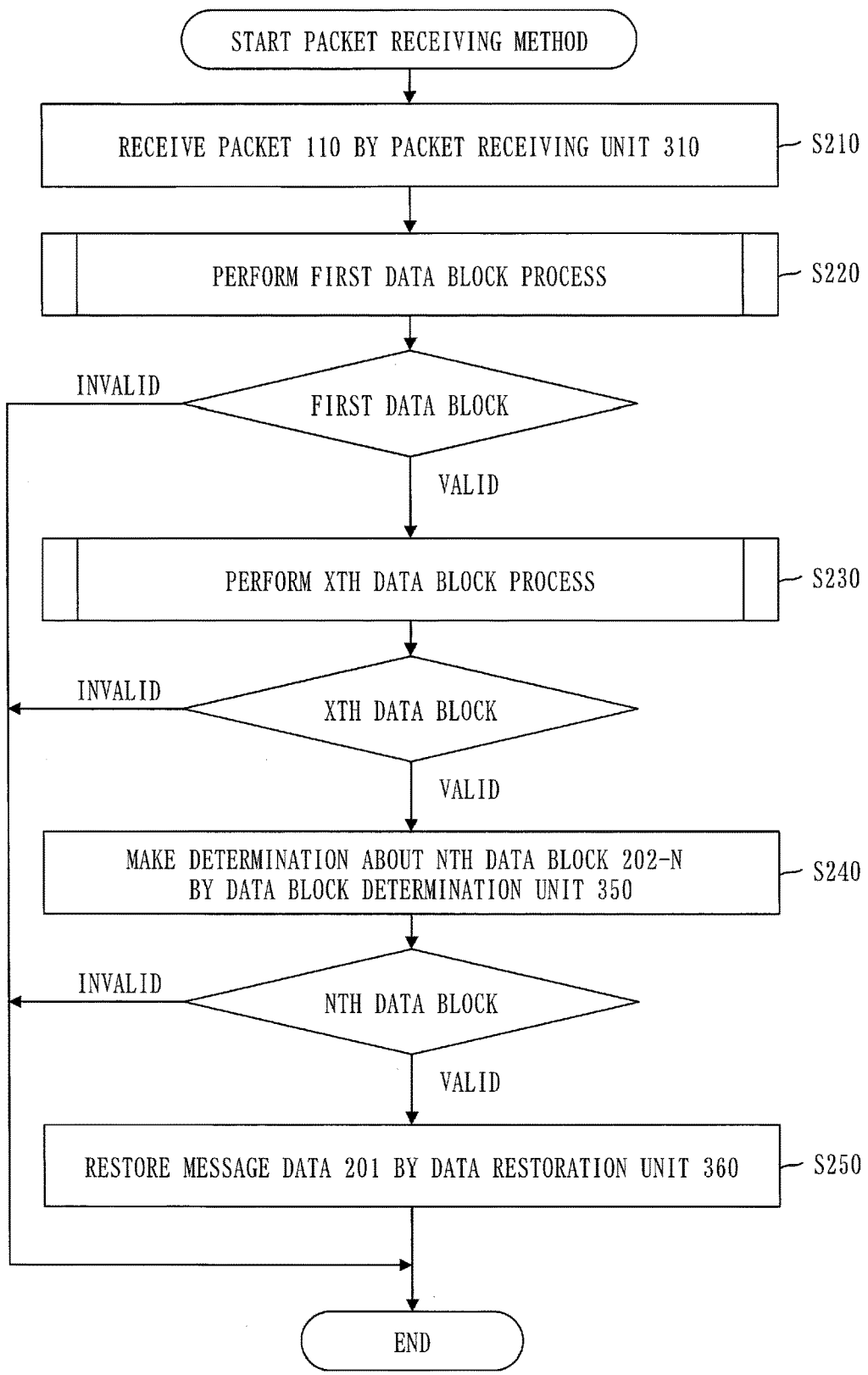
FIG. 12 is a flowchart of the packet receiving method in the first embodiment.

The flow of the processes of the packet receiving method is the same as that in the first embodiment (see FIG. 12).

The packet receiving process (S210), the data block determination process (S240), and the data restoration process (S250) are the same as those in the first embodiment.

Hereinafter, a first data block process (S220B) and an Xth data block process (S230B) will be described.

Figure 23:
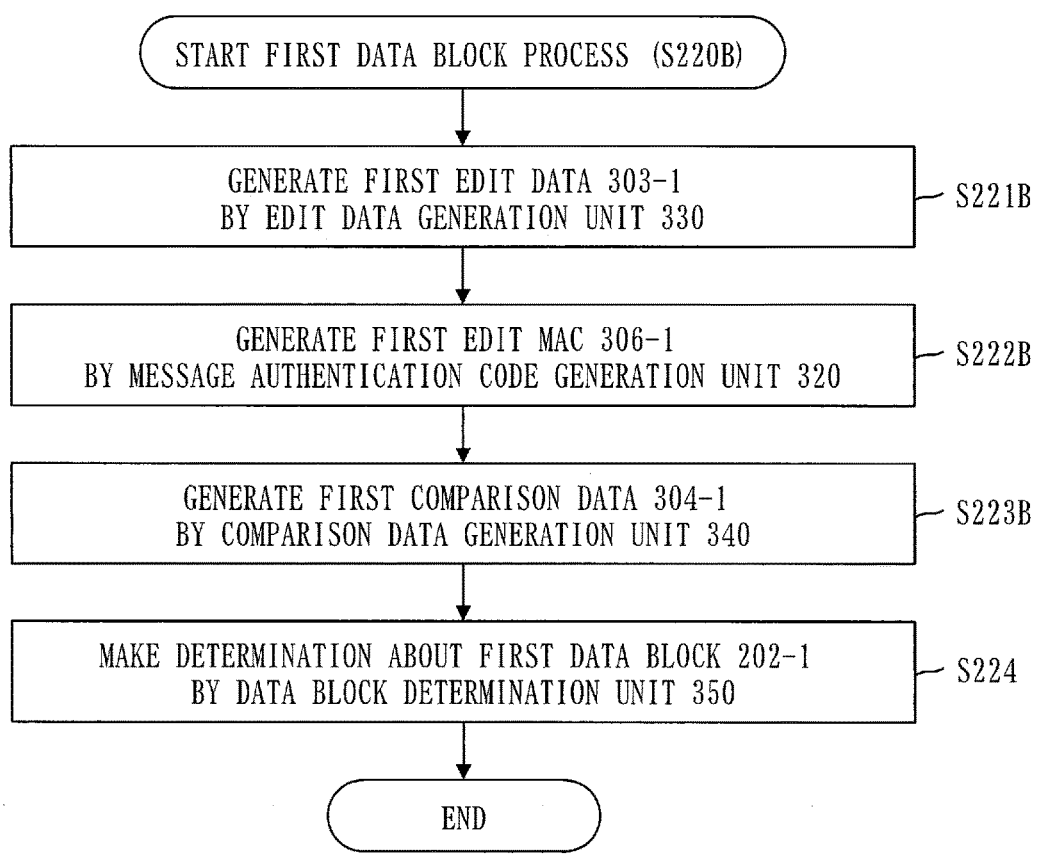
FIG. 23 is a flowchart of a first data block process (S220B) in the second embodiment.

The first data block process (S220B) will be described, based on FIG. 23.

In S221B, the edit data generation unit 330 generates the first edit data 303-1, using the first data block 202-1, the packet number (1), and the initial value of the edit MAC 306.

The first edit data 303-1 is data obtained by concatenating the packet number (1) and the initial value of the edit MAC 306 with the first data block 202-1.

The initial value of the edit MAC 306 is all zero.

In S222B, the message authentication code generation unit 320 calculates the MAC generating function, using the first edit data 303-1 and the common key 101 as inputs. This generates the first edit MAC 306-1.

The first edit MAC 306-1 is the message authentication code of the first edit data 303-1.

In S223B, the comparison data generation unit 340 extracts Y bits (0<Y≤256) at the beginning of the first edit MAC 306-1, as the first comparison data 304-1.

Figure 13:
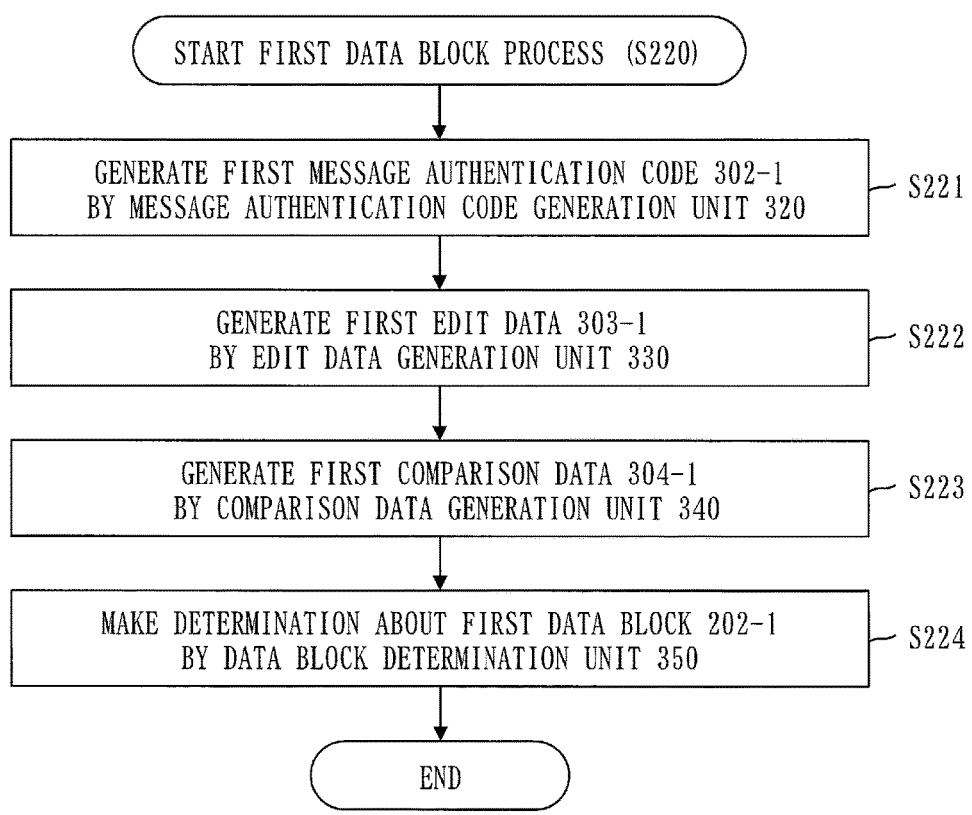
FIG. 13 is a flowchart of a first data block process (S220) in the first embodiment.

S224 is the same as that in the first embodiment (see FIG. 13).

Figure 24:
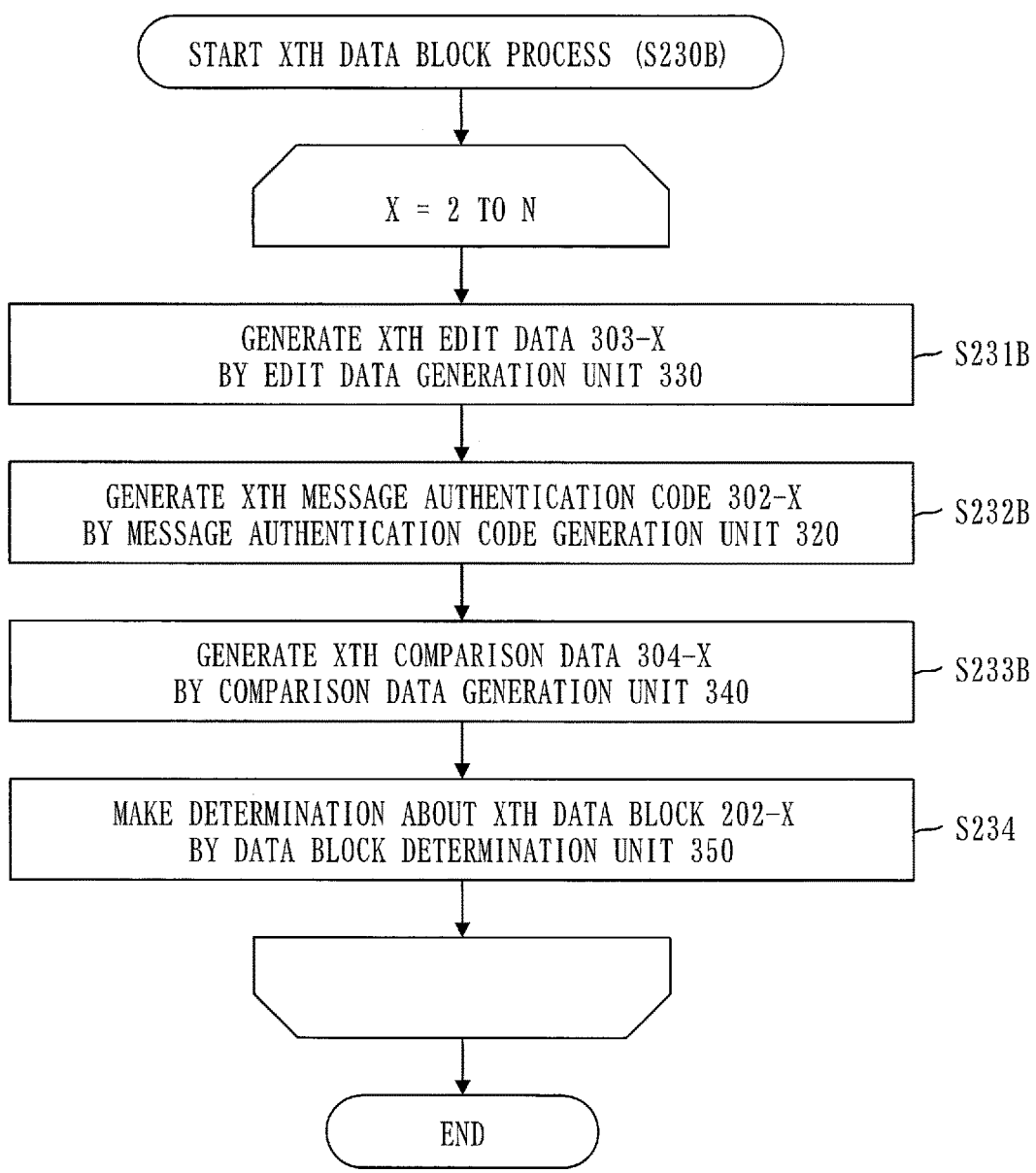
FIG. 24 is a flowchart of an Xth data block process (S230B) in the second embodiment.

The Xth data block process (S230B) will be described, based on FIG. 24.

In S231B, the edit data generation unit 330 generates the Xth edit data 303-X, using the Xth data block 202-X, the packet number (X), and the X−1th edit MAC 306-X−1.

The Xth edit data 303-X is data obtained by concatenating the packet number (X) and the X−1th edit MAC 306-X−1 with the Xth data block 202-X.

In S232B, the message authentication code generation unit 320 calculates the MAC generating function, using the Xth edit data 303-1 and the common key 101 as inputs. This generates the Xth edit MAC 306-X.

The Xth edit MAC 306-X is the message authentication code of the Xth edit data 303-X.

In S233B, the comparison data generation unit 340 extracts Y bits (0<Y≤256) at the beginning of the Xth edit MAC 306-X, as the Xth comparison data 304-X.

S234 is the same as that in the first embodiment (see FIG. 14).

Description of Effects

The Xth additional data 205-X also includes information on each data block 202 before an X−1th data block 202-X−1. Thus, a detection rate of falsification of the Xth data block 202-X may be enhanced.

Since the number of times of calculation of the MAC generating function is a half of that in the first embodiment, a processing time for the data blocks 202 may be reduced.

Third Embodiment

A description will be given about an embodiment where each data block 202 in the first embodiment is encrypted, based on FIGS. 25 to 30.

Description of Configuration

Figure 25:
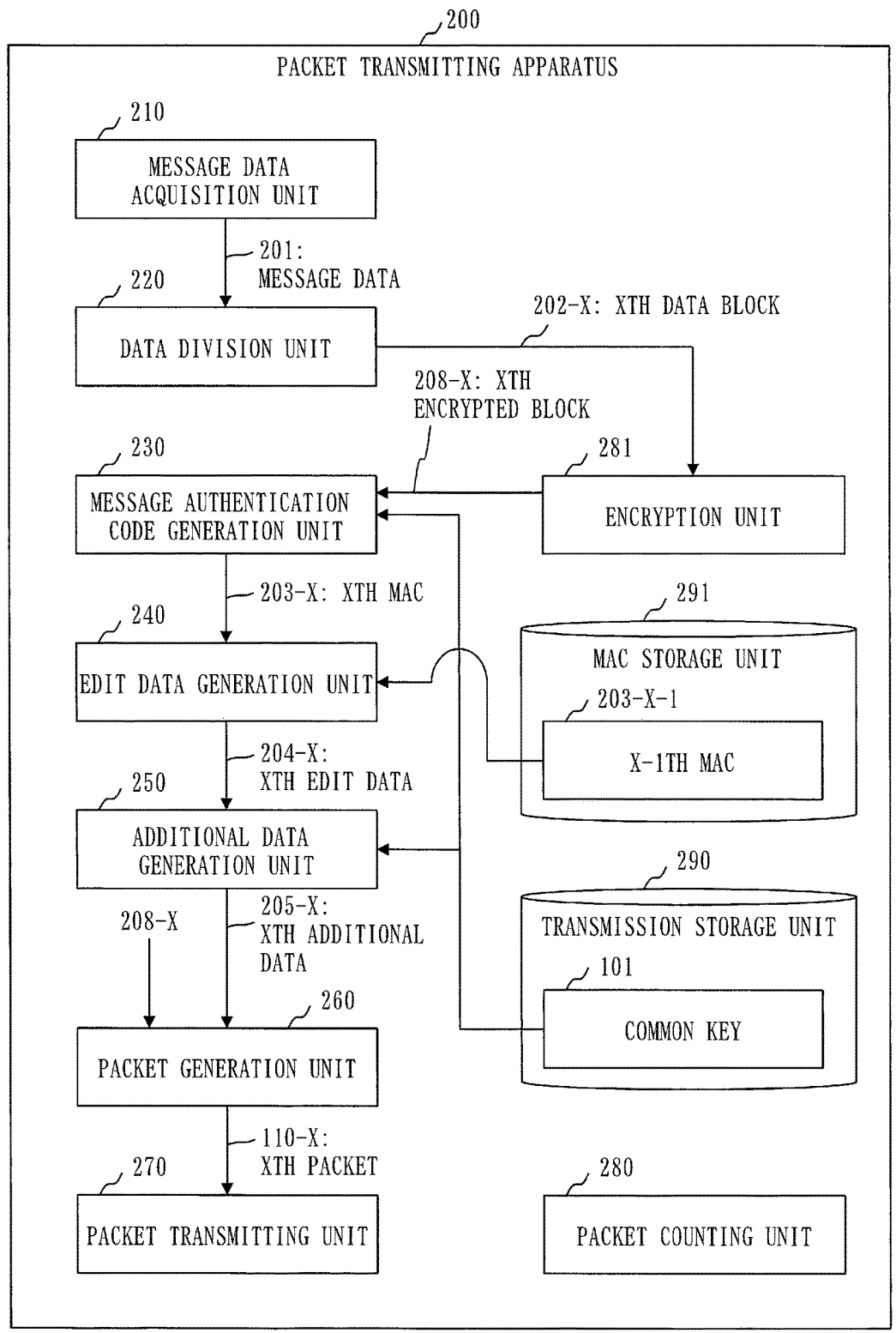
FIG. 25 is a functional configuration diagram of the packet transmitting apparatus 200 in a third embodiment.

As illustrated in FIG. 25, the packet transmitting apparatus 200 includes, in addition to the functions described in the first embodiment (see FIG. 3), an encryption unit 281.

The encryption unit 281 encrypts the Xth data block 202-X, thereby generating an Xth encrypted block 208-X. The Xth encrypted block 208-X is the Xth data block 202-X encrypted.

The message authentication code generation unit 230 generates an Xth message authentication code 203-X, using the Xth encrypted block 208-X instead of the Xth data block 202-X.

The packet generation unit 260 generates an Xth packet 110-X including the Xth encrypted block 208-X instead of the Xth data block 202-X.

Figure 26:
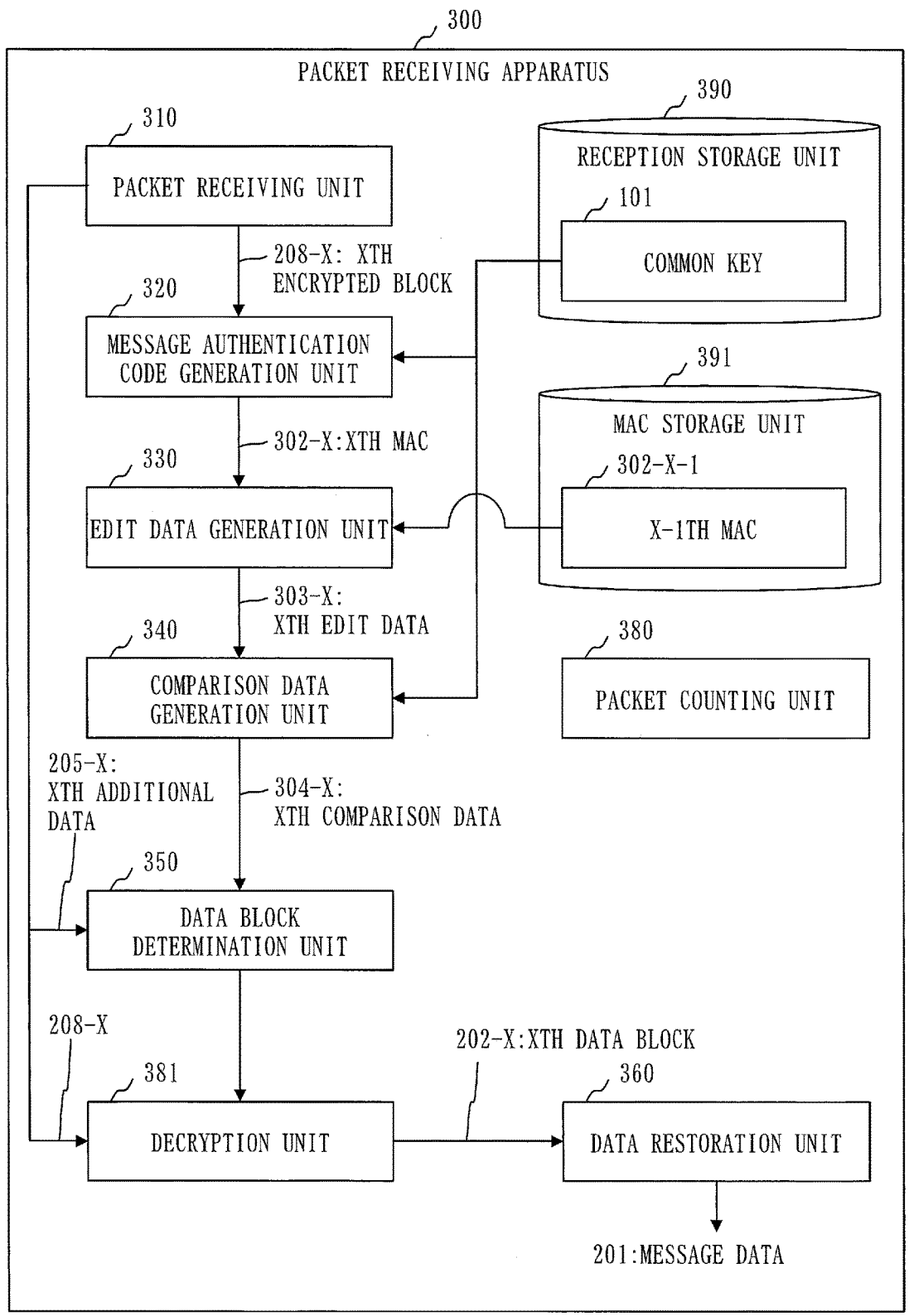
FIG. 26 is a functional configuration diagram of the packet receiving apparatus 300 in the third embodiment.

As illustrated in FIG. 26, the packet receiving apparatus 300 includes, in addition to the functions described in the first embodiment (see FIG. 4), a decryption unit 381.

The decryption unit 381 decrypts the first to Nth data blocks 202.

Description of Operations

A flow of processes of a packet transmitting method will be described, based on FIG. 27.

S110, S120, and S150 are the same as those in the first embodiment (see FIG. 7).

In S121, the encryption unit 281 encrypts the N data blocks 202 using an encryption key, thereby generating N encrypted blocks 208. The encryption key is the common key 101 or a different key.

A first encrypted block process (S130C) is a process in which the data block 202 has been replaced with the encrypted block 208 in the first data block process (S130) in the first embodiment.

An Xth encrypted block process (S140C) is a process in which the data block 202 has been replaced with the encrypted block 208 in the Xth data block process (S140) in the first embodiment.

Figure 6:
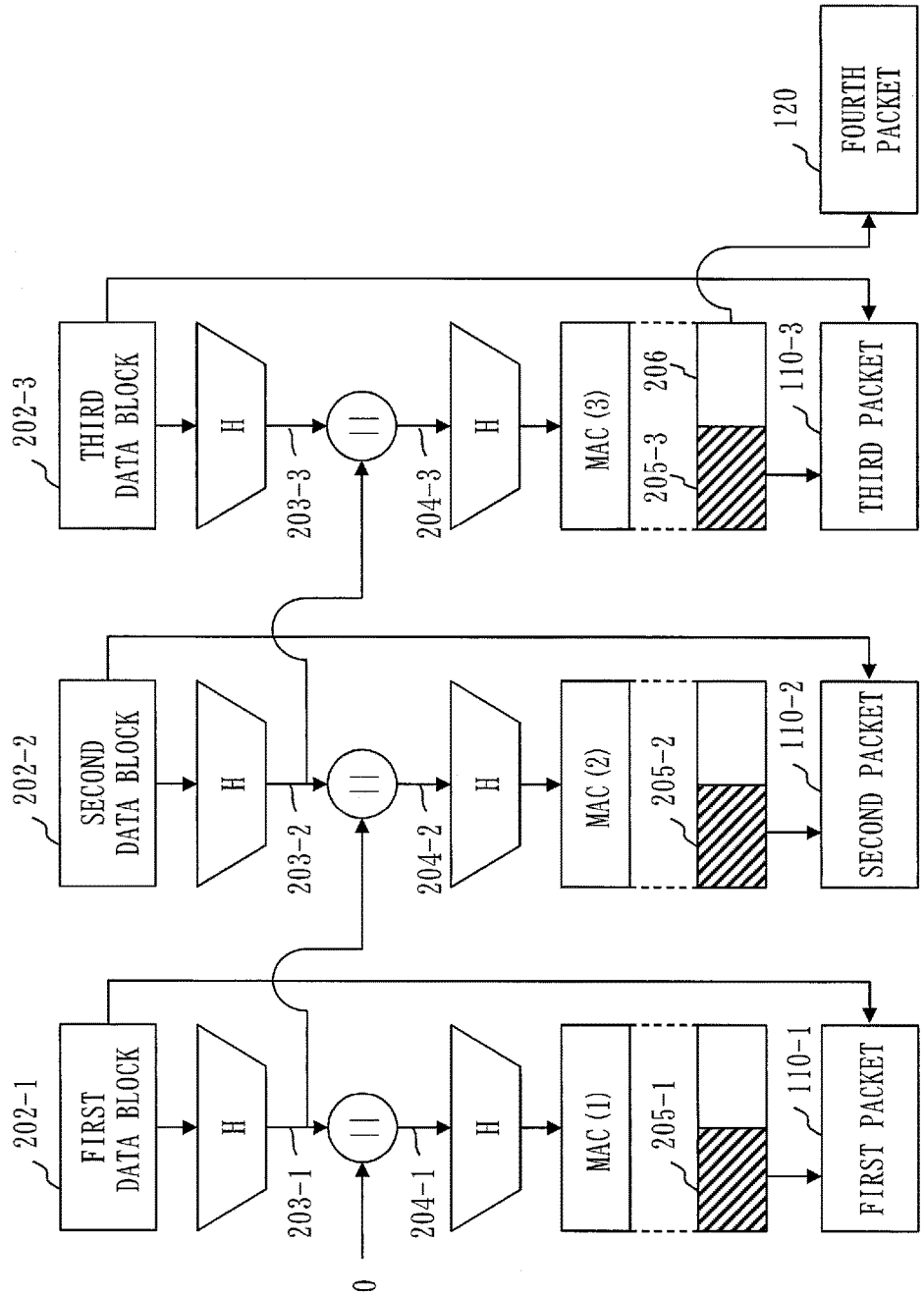
FIG. 6 is a schematic diagram of a packet transmitting method in the first embodiment.
Figure 28:
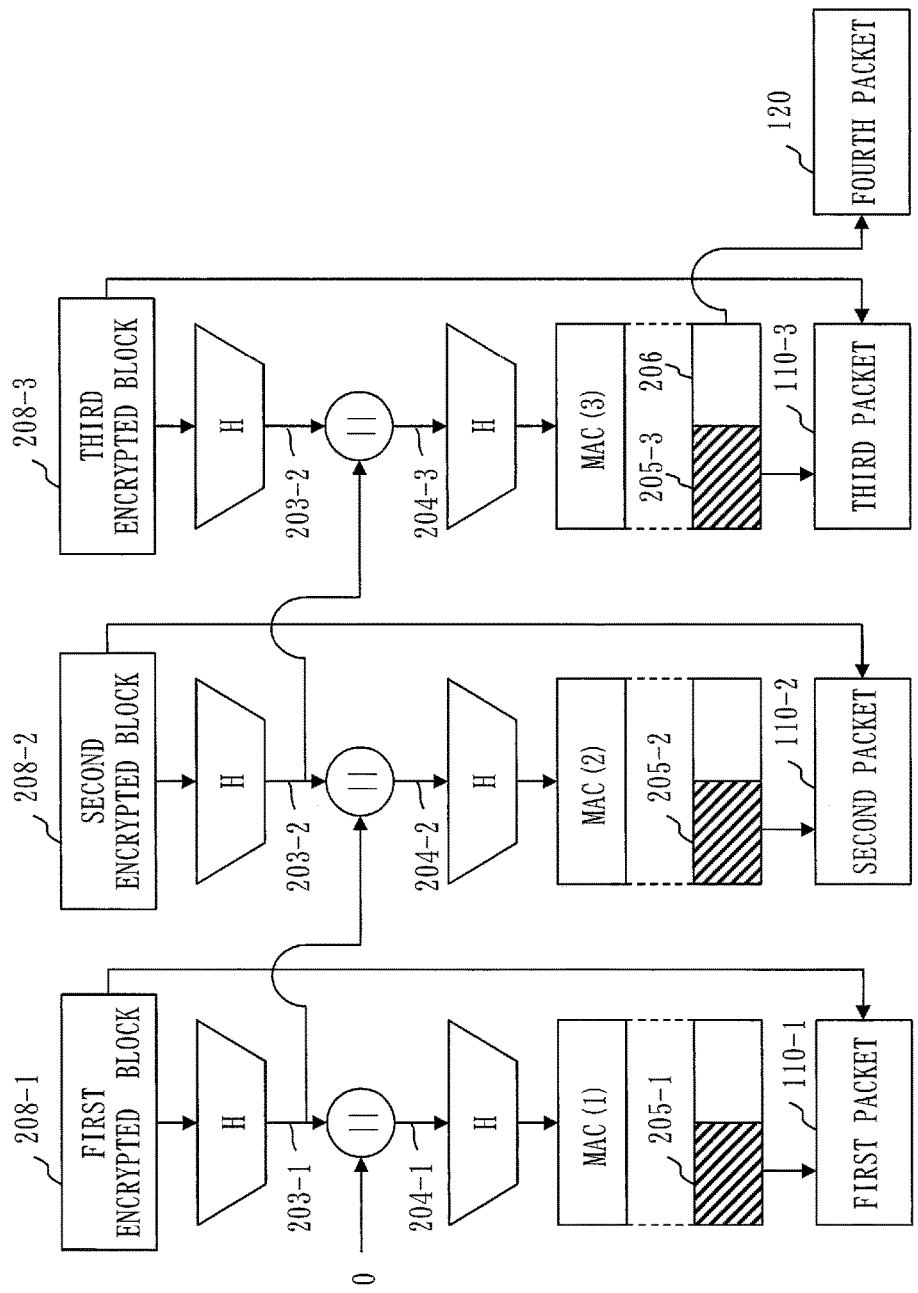
FIG. 28 is a schematic diagram of the packet transmitting method in the third embodiment.

FIG. 28 corresponds to FIG. 6 in the first embodiment. In FIG. 28, the encrypted blocks 208 are processed instead of the data blocks 202 in FIG. 6.

A flow of processes of a packet receiving method will be described, based on FIG. 29.

S210 is the same as that in the first embodiment (see FIG. 12).

A first encrypted block process (S220C) is a process in which the data block 202 in the first data block process (S220) in the first embodiment has been replaced with the encrypted block 208.

An Xth encrypted block process (S230C) is a process in which the data block 202 in the Xth data block process (S230) in the first embodiment has been replaced with the encrypted block 208.

An Nth data block determination process (S240C) is a process in which the data block 202 in the Nth data block determination process (S240) in the first embodiment has been replaced with the encrypted block 208.

In S251, the decryption unit 381 decrypts the first to Nth encrypted blocks 208, using a decryption key. The decryption key is the common key 101 or a different key.

S250 is the same as that in the first embodiment.

Figure 11:
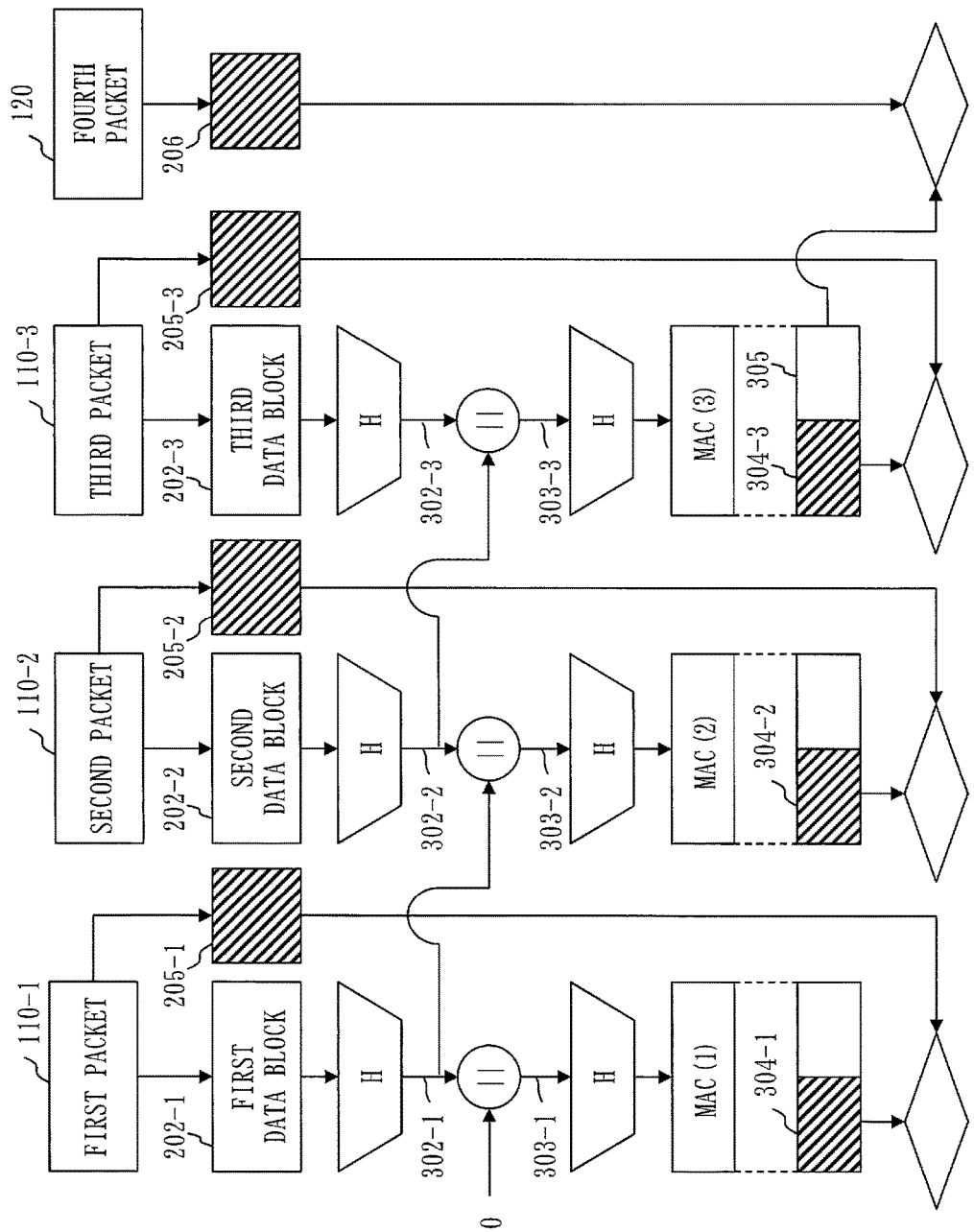
FIG. 11 is a schematic diagram of a packet receiving method in the first embodiment.
Figure 30:
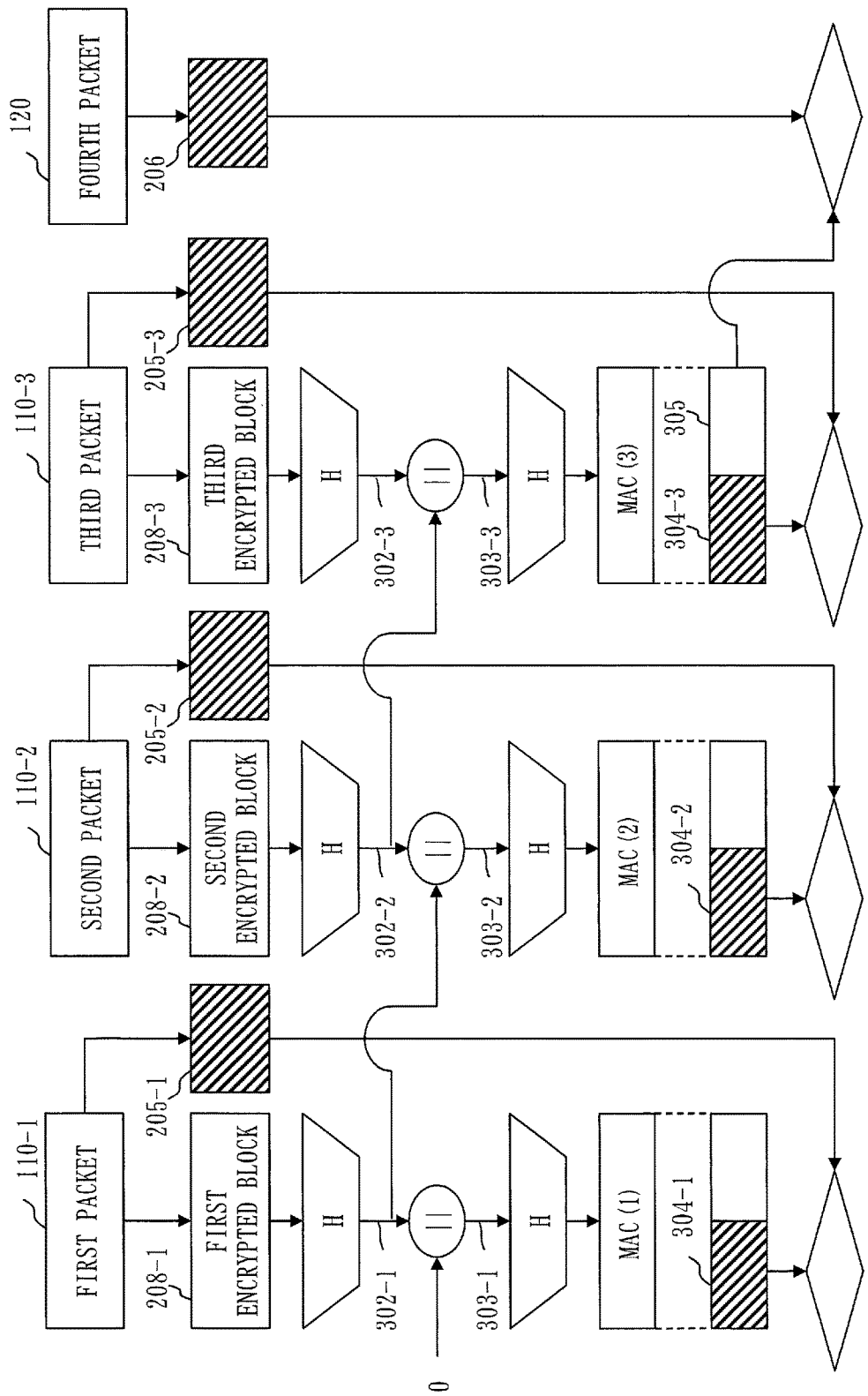
FIG. 30 is a schematic diagram of the packet receiving method in the third embodiment.

FIG. 30 corresponds to FIG. 11 in the first embodiment. In FIG. 30, the encrypted blocks 208 are processed instead of the data blocks 202 in FIG. 11.

Description of Effect

Confidentiality of the message data 201 may be secured by encryption of each data block 202.

Fourth Embodiment

A description will be given about an embodiment where each data block 202 in the second embodiment is encrypted, using FIGS. 31 to 34.

Description of Configuration

Figure 31:
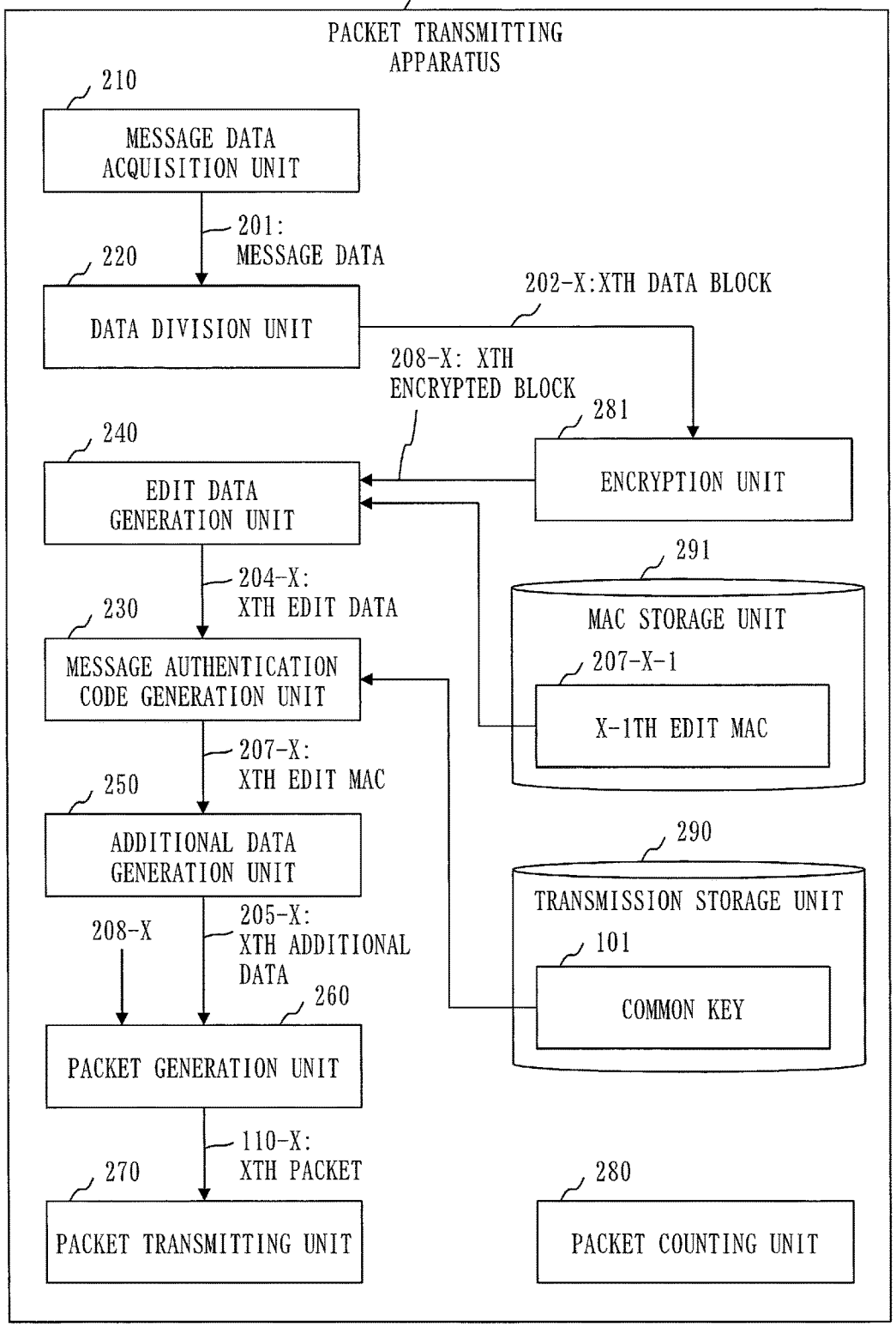
FIG. 31 is a functional configuration diagram of the packet transmitting apparatus 200 in a fourth embodiment.

As illustrated in FIG. 31, the packet transmitting apparatus 200 includes, in addition to the functions described in the second embodiment (see FIG. 15), the encryption unit 281.

The encryption unit 281 encrypts the Xth data block 202-X, thereby generating an Xth encrypted block 208-X. The Xth encrypted block 208-X is the Xth data block 202-X encrypted.

The edit data generation unit 240 generates Xth edit data 204-X by using the Xth encrypted block 208-X instead of the Xth data block 202-X.

The packet generation unit 260 generates an Xth packet 110-X including the Xth encrypted block 208-X instead of the Xth data block 202-X.

Figure 32:
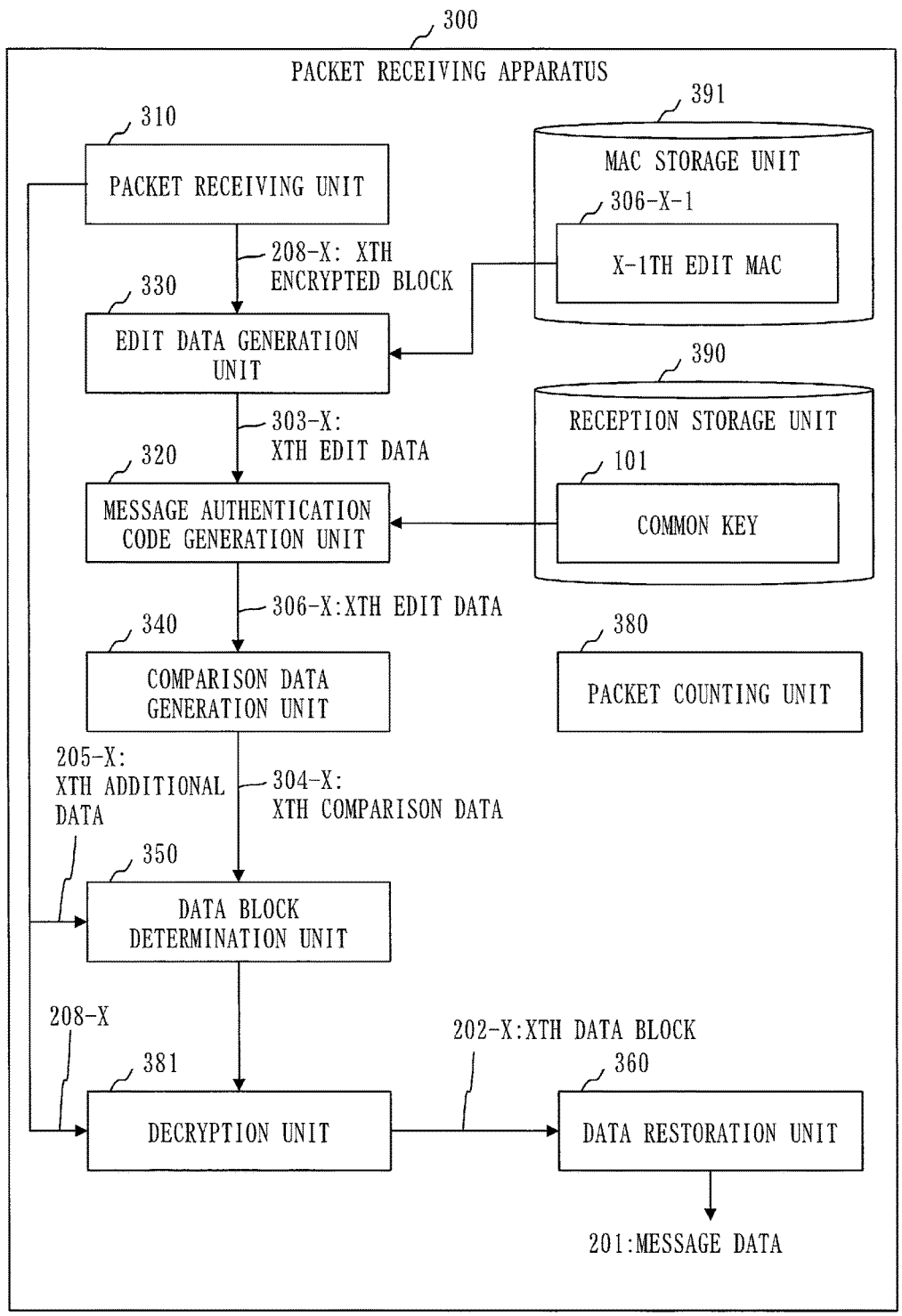
FIG. 32 is a functional configuration diagram of the packet receiving apparatus 300 in the fourth embodiment.

As illustrated in FIG. 32, the packet receiving apparatus 300 includes, in addition to the functions described in the second embodiment (see FIG. 16), the decryption unit 381.

The decryption unit 381 decrypts the first to Nth data blocks 202.

Description of Operations

Figure 27:
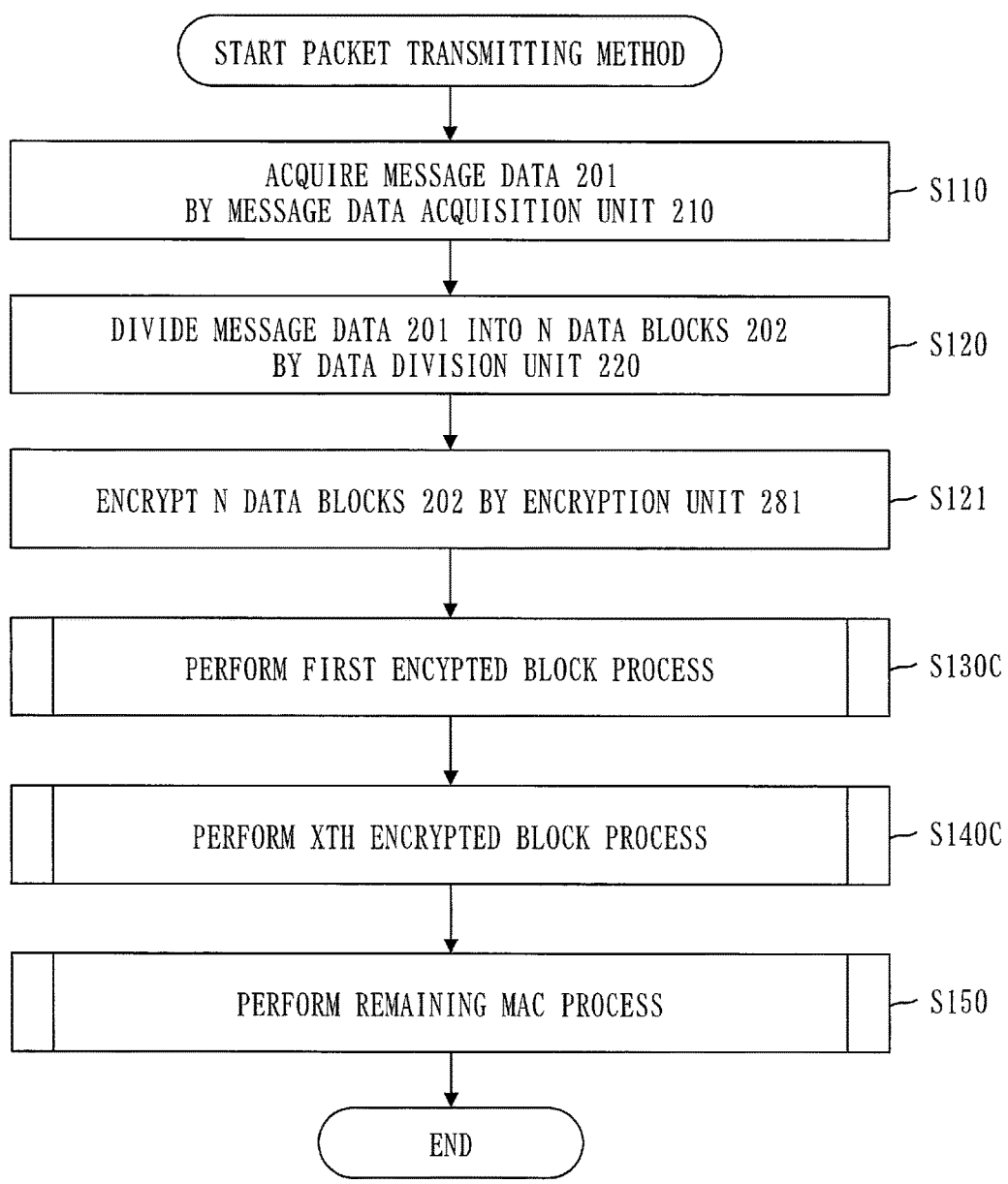
FIG. 27 is a flowchart of a packet transmitting method in the third embodiment.

A flow of processes of a packet transmitting method is the same as that in the third embodiment (see FIG. 27).

A first encrypted block process (S130C) is, however, a process in which the data block 202 in the first data block process (S130B) in the second embodiment has been replaced with the encrypted block 208.

An Xth encrypted block process (S140C) is a process in which the data block 202 in the Xth data block process (S140B) in the second embodiment has been replaced with the encrypted block 208.

Figure 17:
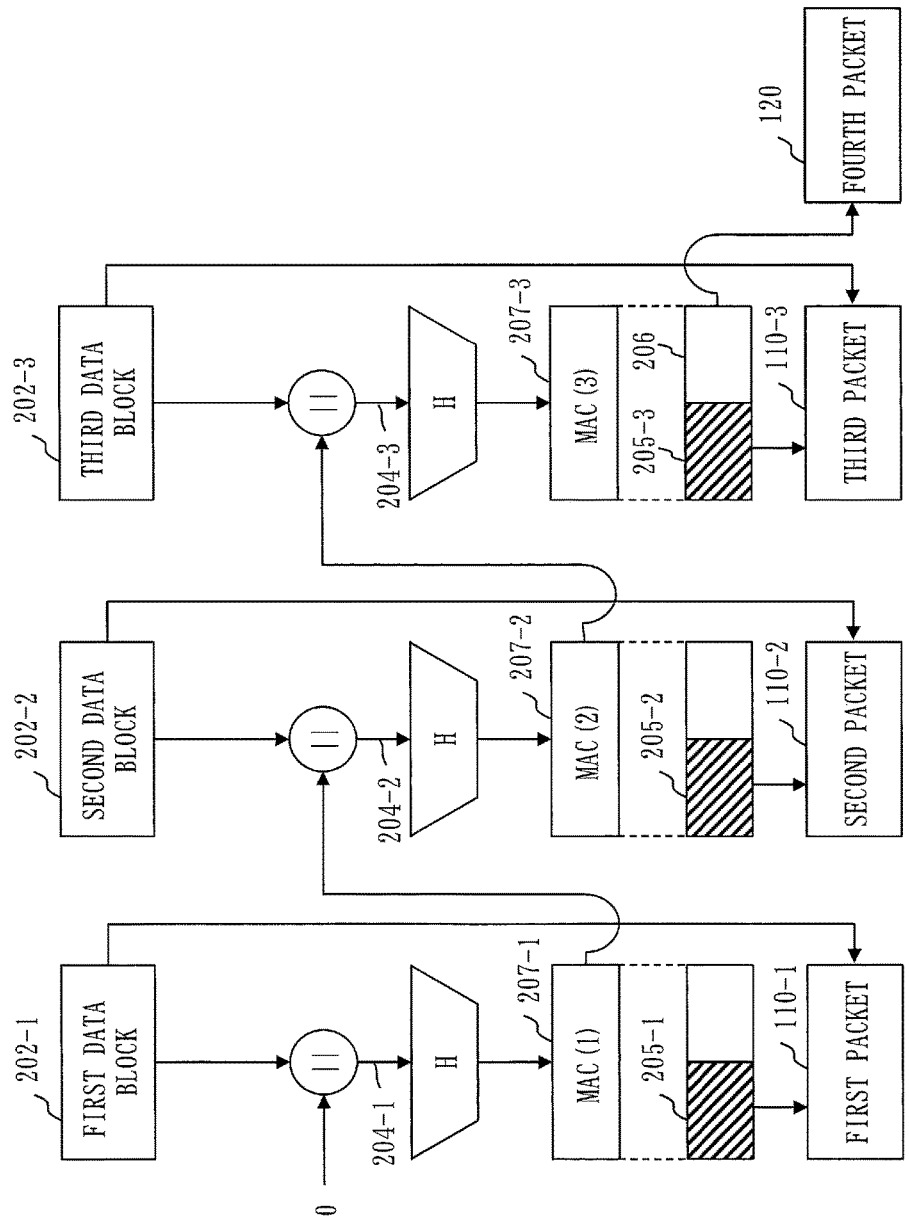
FIG. 17 is a schematic diagram of a packet transmitting method in the second embodiment.
Figure 33:
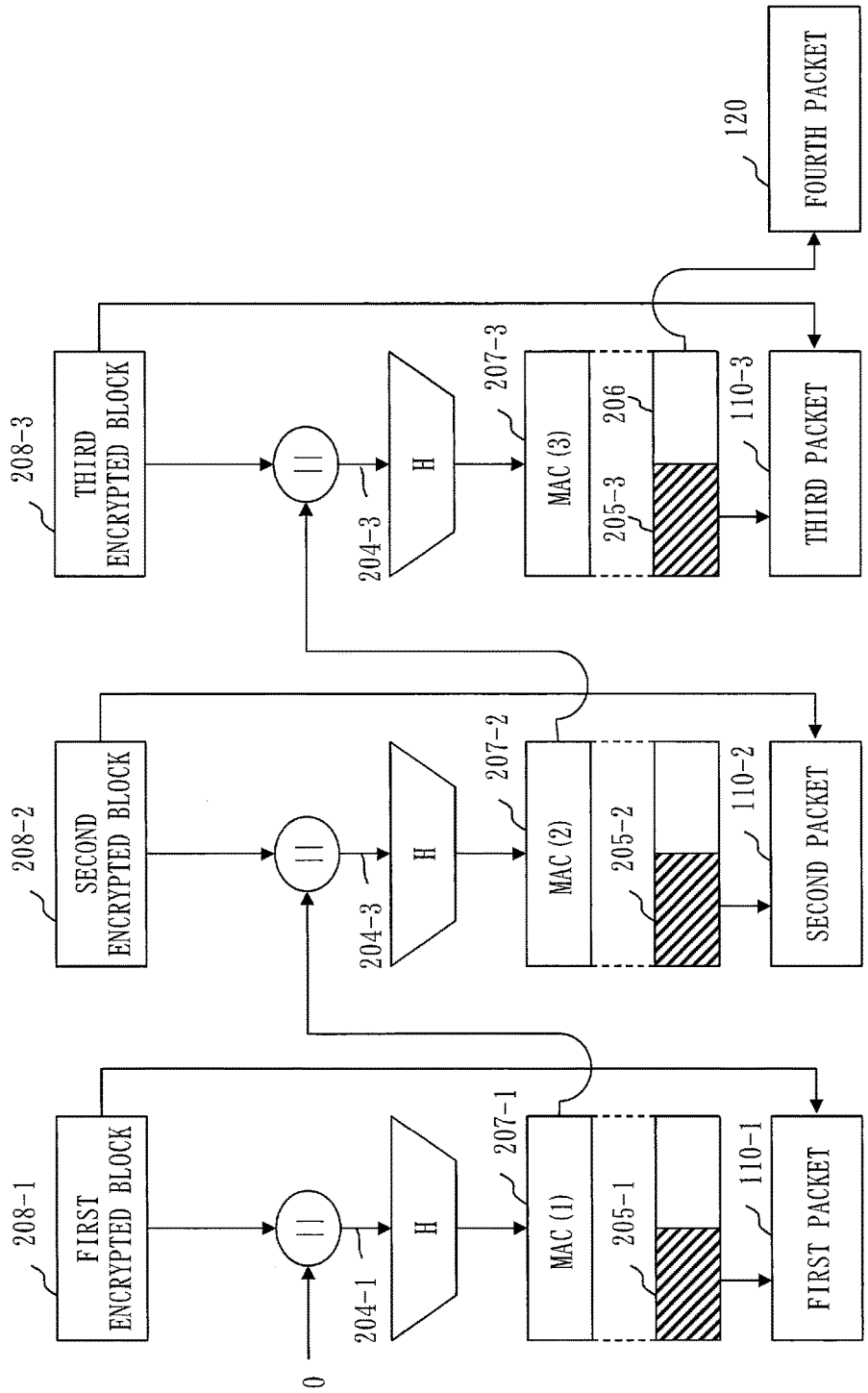
FIG. 33 is a schematic diagram of a packet transmitting method in the fourth embodiment.

FIG. 33 corresponds to FIG. 17 in the second embodiment. In FIG. 33, the encrypted blocks 208 are processed instead of the data blocks 202 in FIG. 17.

Figure 29:
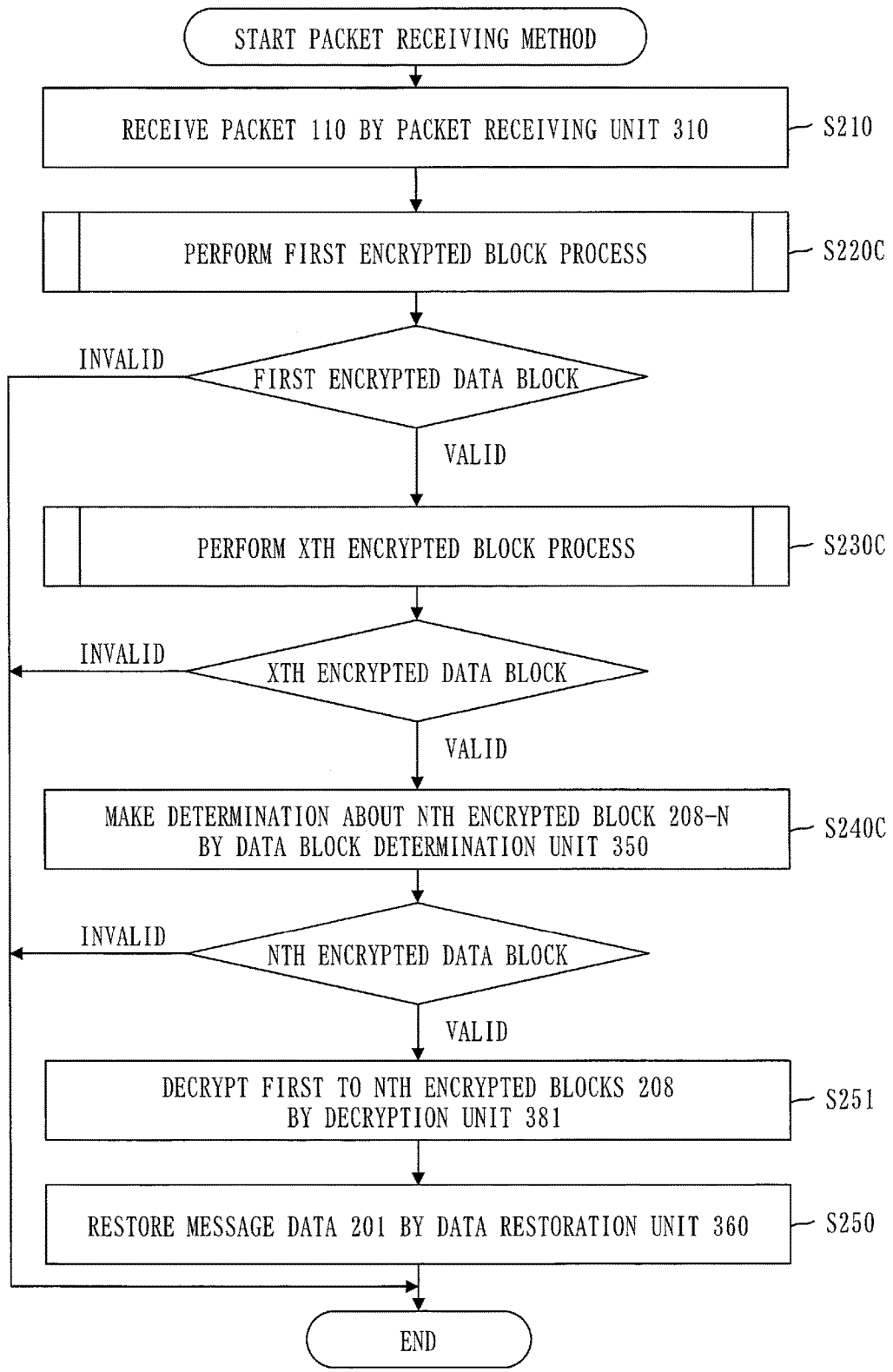
FIG. 29 is a flowchart of a packet receiving method in the third embodiment.

A flow of processes of a packet receiving method is the same as that in the third embodiment (see FIG. 29).

A first encrypted block process (S220C) is, however, a process in which the data block 202 in the first data block process (S220B) in the second embodiment has been replaced with the encrypted block 208.

An Xth encrypted block process (S230C) is a process in which the data block 202 in the Xth data block process (S230B) in the second embodiment has been replaced with the encrypted block 208.

Figure 21:
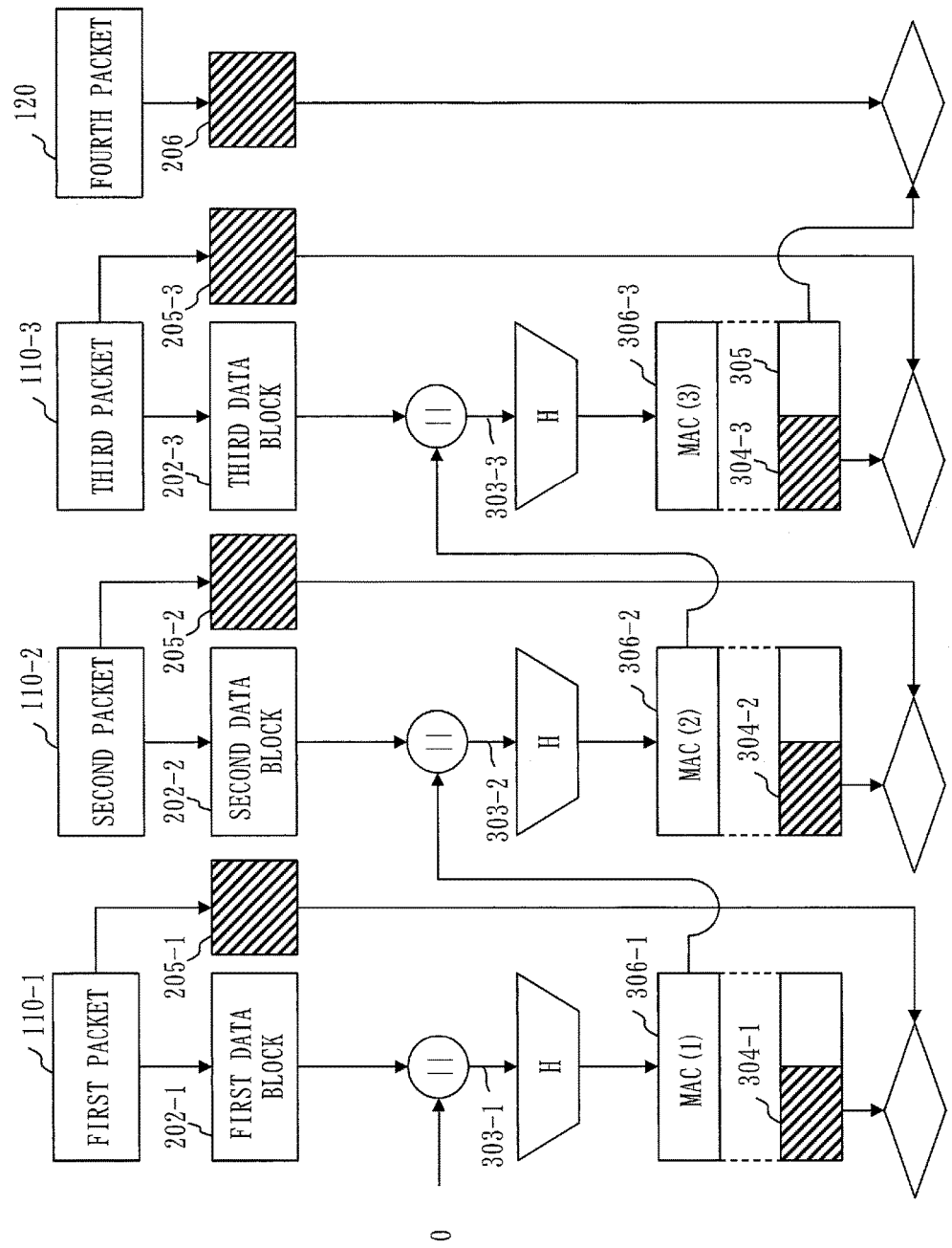
FIG. 21 is a schematic diagram of a packet receiving method in the second embodiment.
Figure 34:
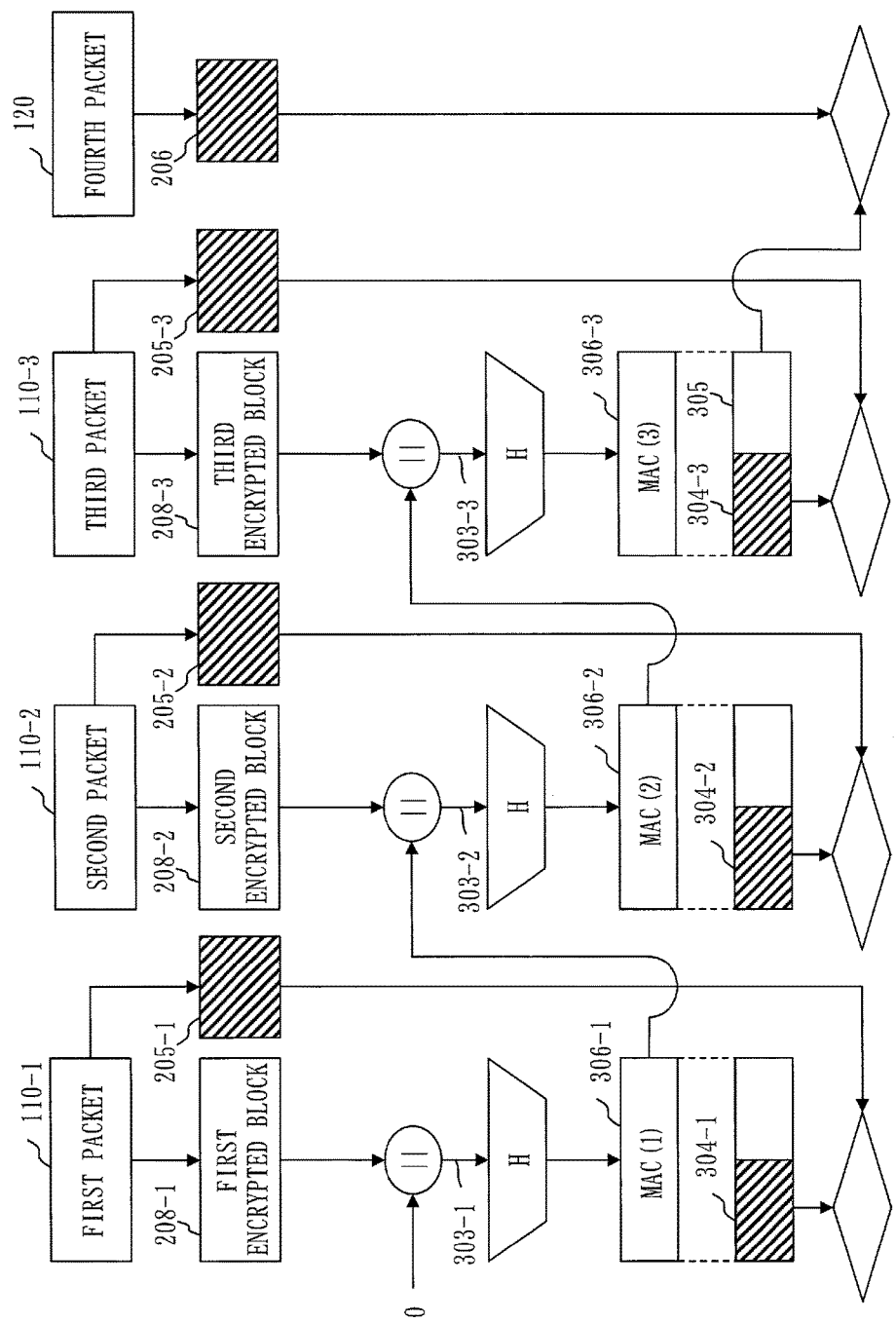
FIG. 34 is a schematic diagram of a packet receiving method in the fourth embodiment.

FIG. 34 corresponds to FIG. 21 in the second embodiment. In FIG. 34, the encrypted blocks 208 are processed instead of the data blocks 202 in FIG. 21.

Description of Effect

Confidentiality of the message data 201 may be guaranteed by encryption of each data block 202.

Each embodiment illustrates a preferred mode, and does not intend to limit a technical range of the present invention.

Each embodiment may be partially carried out, or may be combined with a different embodiment to be carried out.

The process procedures described using the flowcharts and so on are respective examples of the process procedures of the packet transmitting method, the packet transmitting program, the packet receiving method, and the packet receiving program.

Each embodiment may be configured as follows.

The packet transmitting apparatus 200 may be a packet communication apparatus including the functions of the packet receiving apparatus 300.

Edit data may be generated by edition other than concatenation.

Additional data and comparison data may be all of the message authentication code of the edit data rather than a part of the message authentication code of the edit data. Further, the additional data and the comparison data may be data different from each of the part of the message authentication code of the edit data and the all of the message authentication code of the edit data if the additional data and the comparison data are data to be generated using the edit data.

Each of reference signs that will be listed below sums up hyphenated reference signs. To take an example, the data block 202 is a collective term for the first data block 202-1, the Xth data block 202-X, and the Nth data block 202-N.

REFERENCE SIGNS LIST

100: packet communication system, 109: network, 110: packet, 111: header, 120: N+1th packet, 121: N+1th header, 200: packet transmitting apparatus, 201: message data, 202: data block, 203: message authentication code, 204: edit data, 205: additional data, 206: remaining message authentication code, 207: edit MAC, 208: encrypted block, 210: message data acquisition unit, 220: data division unit, 230: message authentication code generation unit, 240: edit data generation unit, 250: additional data generation unit, 260: packet generation unit, 270: packet transmitting unit, 280: packet counting unit, 290: transmission storage unit, 291: message authentication code storage unit, 300: packet receiving apparatus, 302: message authentication code, 303: edit data, 304: comparison data, 305: remaining comparison data, 306: edit MAC, 310: packet receiving unit, 320: message authentication code generation unit, 330: edit data generation unit, 340: comparison data generation unit, 350: data block determination unit, 360: data restoration unit, 390: reception storage unit, 391: message authentication code storage unit, 901: processor, 902: auxiliary storage device, 903: memory, 904: communication device, 9041: receiver, 9042: transmitter, 905: input interface, 906: display interface, 907: input device, 908: display, 910: signal line, 911: cable, 912: cable

The invention claimed is:

1. A packet transmitting apparatus comprising:
a memory storing a program; and
processing circuitry executing the program to:
generate, for each data block included in N data blocks, a message authentication code of the data block;
generate Xth edit data by using the message authentication code of an Xth data block and the message authentication code of an (X−1)th data block of the N data blocks and concatenating the message authentication code of the (X−1)th data block with the message authentication code of the Xth data block, the Xth data block being one data block out of a second data block to an Nth data block in the N data blocks;

generate a message authentication code of the Xth edit data using the Xth edit data and extract a portion of the message authentication code of the Xth edit data as Xth additional data a being data to be added to the Xth data block;

generate an Xth packet including the Xth data block and the Xth additional data; and transmit the Xth packet.

2. The packet transmitting apparatus according to claim 1, wherein the processing circuitry generates a message authentication code of Nth edit data and extracts Nth additional data from the message authentication code of the Nth edit data;

generates a packet including a portion obtained by excluding the Nth additional data from the message authentication code of the Nth edit data, as an (N+1)th packet; and transmits the (N+1)th packet.

3. The packet transmitting apparatus according to claim 1, wherein the processing circuitry generates first edit data using the message authentication code of a first data block and an initial value of the message authentication code;

generates first additional data using the first edit data;

generates a first packet including the first data block and the first additional data; and transmits the first packet.

4. The packet transmitting apparatus according to claim 1, wherein each data block of the N data blocks is an encrypted data block.

5. A packet transmitting apparatus comprising:

a memory storing a program; and processing circuitry executing the program to:

generate (X−1)th edit data by concatenating a message authentication code of (X−2)th edit data corresponding to an (X−2)th data block with an (X−1)th data block being one data block out of a second data block to an (N−1)th data block in N data blocks;

generate a message authentication code of the (X−1)th edit data;

extract a portion of the message authentication code of the (X−1)th edit data as (X−1)th additional data;

generate an (X−1)th packet including the (X−1)th data block and the (X−1)th additional data; and transmit the (X−1)th packet;

wherein the processing circuitry generates Xth edit data by concatenating the message authentication code of the (X−1)th edit data with an Xth data block of the N data blocks;

generates a message authentication code of the Xth edit data;

extracts a portion of the message authentication code of the Xth edit data as Xth additional data;

generates an Xth packet including the Xth data block and the Xth additional data; and transmits the Xth packet.

6. The packet transmitting apparatus according to claim 5, wherein each data block of the N data blocks is an encrypted data block.

7. A non-transitory computer readable medium storing a packet transmitting program for causing a computer to execute:

a message authentication code generation process of generating, for each data block included in N data blocks, a message authentication code of the data block;

an edit data generation process of generating Xth edit data by using the message authentication code of an Xth data block and the message authentication code of an (X−1)th data block of the N data blocks and concatenating the message authentication code of the (X−1)th data block with the message authentication code of the Xth data block, the Xth data block being one data block out of a second data block to an Nth data block in the N data blocks;

an additional data generation process of generating a message authentication code of the Xth edit data using the Xth edit data, and extracting a portion of the message authentication code of the Xth edit data as Xth additional data being data to be added to the Xth data block;

a packet generation process of generating an Xth packet including the Xth data block and the Xth additional data; and a packet transmitting process of transmitting the Xth packet.

8. A non-transitory computer readable medium storing a packet transmitting program to cause a computer to execute:

an edit data generation process of generating (X−1)th edit data by concatenating a message authentication code of (X−2)th edit data corresponding to an (X−2)th data block with an (X−1)th data block being one data block out of a second data block to an (N−1)th data block in N data blocks;

a message authentication code generation process of generating a message authentication code of the (X−1)th edit data;

an additional data generation process of extracting a portion of the message authentication code of the (X−1)th edit data as (X−1)th additional data;

a packet generation process of generating an (X−1)th packet including the (X−1)th data block and the (X−1)th additional data; and a packet transmitting process of transmitting the (X−1)th packet, wherein, in the edit data generation process, Xth edit data is generated by concatenating the message authentication code of the (X−1)th edit data with an Xth data block of the N data blocks;

wherein, in the message authentication code generation process, a message authentication code of the Xth edit data is generated;

wherein, in the additional data generation process, a portion of the message authentication code of the Xth edit data is extracted as Xth additional data;

wherein, in the packet generation process, an Xth packet including the Xth data block and the Xth additional data is generated; and wherein, in the packet transmitting process, the Xth packet is transmitted.

* * * * *